United States Patent
Wong et al.

(10) Patent No.: US 7,991,872 B2
(45) Date of Patent: Aug. 2, 2011

(54) VERTICAL INTEGRATION OF NETWORK MANAGEMENT FOR ETHERNET AND THE OPTICAL TRANSPORT

(75) Inventors: Cho-Leung Wong, Morganville, NJ (US); Chin-Wang Chao, Lincroft, NJ (US); Meei-Ling Chen, Branchburg, NJ (US); Hsiao-Hsien Hu, Whippany, NJ (US); Ronald E. Papritz, Amityville, NY (US); Sudhakar Rajapu, Edison, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 416 days.

(21) Appl. No.: 12/152,003

(22) Filed: May 12, 2008

(65) Prior Publication Data
US 2009/0279551 A1 Nov. 12, 2009

(51) Int. Cl.
*G06F 15/173* (2006.01)

(52) U.S. Cl. ........ 709/223; 709/217; 709/218; 709/219; 709/224

(58) Field of Classification Search .................. None
See application file for complete search history.

(56) References Cited

U.S. PATENT DOCUMENTS

| | | | |
|---|---|---|---|
| 5,845,081 A * | 12/1998 | Rangarajan et al. | 709/224 |
| 7,197,546 B1 * | 3/2007 | Bagga et al. | 709/223 |
| 2003/0117946 A1 * | 6/2003 | Fontana et al. | 370/216 |
| 2004/0042416 A1 * | 3/2004 | Ngo et al. | 370/254 |

* cited by examiner

*Primary Examiner* — Thu Nguyen
*Assistant Examiner* — Nam Tran

(57) ABSTRACT

Systems and methods are described that vertically integrate telecommunications network management across multiple transport domains and network layers to support E2E network management. Embodiments vertically integrate telecommunications network management across multiple transport layers such as physical layers (optical), data link layers (Ethernet), and upper layers (VLAN), and establish an inventory database for the plurality of transport layers in a network management OSS to integrate and correlate network alarms and other business applications. Embodiments provide a single platform for an E2E network management solution across and for multiple transport domains.

19 Claims, 26 Drawing Sheets

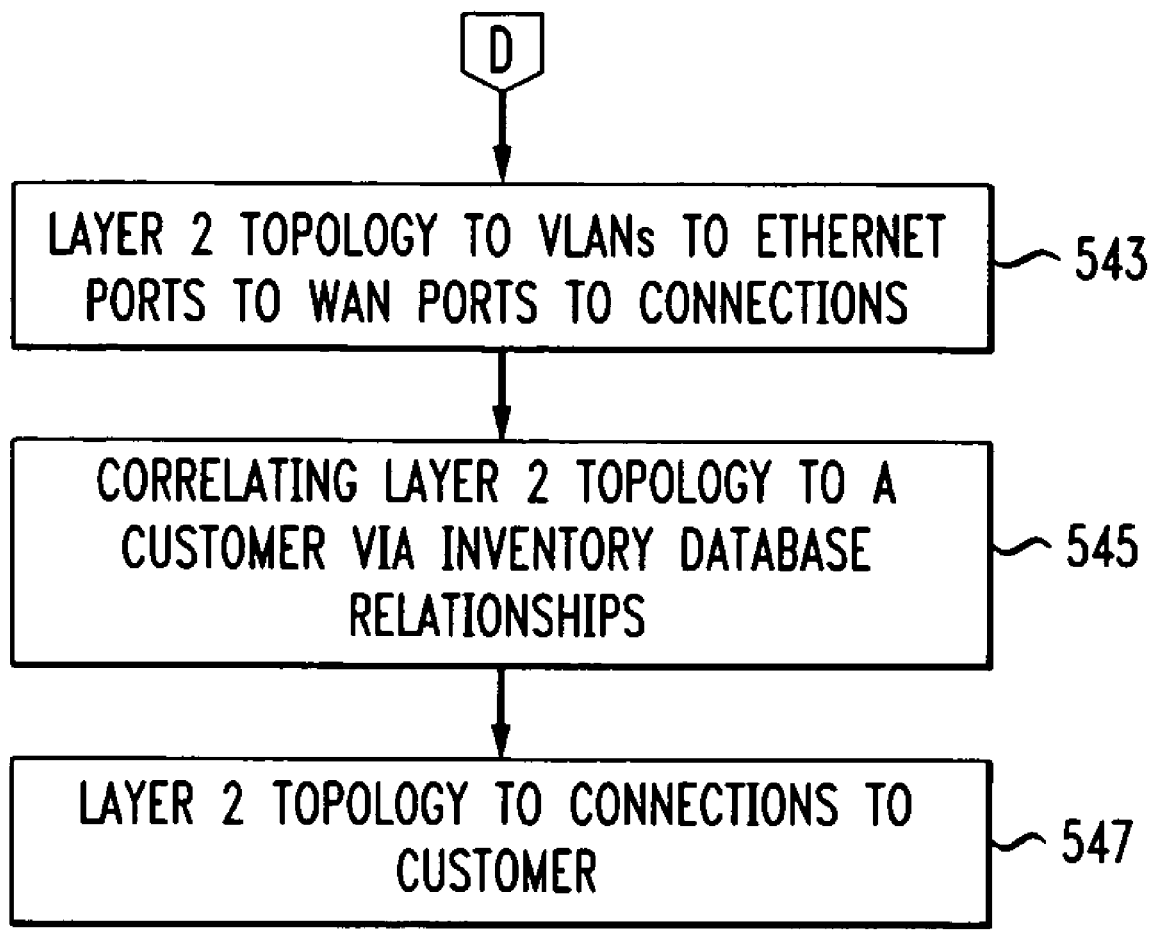

FIG. 13A    LAYER 1 ACQUIRED OPTICAL INFORMATION

| PARAMETER | DEFINITION |
|---|---|
| v_Ems | CONTAIN THE EMC (ELEMENT MANAGEMENT SYSTEM) DATA FOR EMS's THAT UVNS-ONEVU IS AWARE OF. |
| v_Subnetwork | CONTAIN THE SUBNETWORKS THAT UVNS-ONEVU IS AWARE OF. |
| v_Site | STORE A USER-DEFINED, ARBITRARY GROUPING OF NODES. TYPICALLY IT CORRESPONDS TO A GROUP OF NODES ORGANIZED BY GEOGRAPHIC LOCATION. A SITE CAN CONTAIN FROM ONE TO MANY NODES. |
| v_Node | CONTAIN THE NODES WITHIN THE NETWORK. A NODE IS A DEVICE IN THE NETWORK, SUCH AS A CISCO 15454/15216/15530/15540 OR A NORTEL OPTera 3500/5200/OMX OR PATCH PANEL. A NODE MUST BELONG TO ONE SITE. A NODE CAN BELONG TO ONE SUBNETWORK. A NODE CAN HAVE ONE OR MORE CARDS. A NODE CAN PARTICIPATE IN ONE TO MANY RINGS VIA ITS CARDS AND PORTS. A NODE CAN PARTICIPATE IN ONE TO MANY CONNECTIONS VIA ITS CARDS AND PORTS. |
| v_Card | CONTAIN THE DATA OF THE PHYSICAL CARDS IN THE NODE. A CARD BELONGS TO ONE NODE. A CARD CAN HAVE ONE OR MORE PORTS. A CARD CAN HAVE MULTIPLE CONNECTIONS PASS THROUGH IT VIA IT'S PORTS. |
| v_Port | STORE THE DATA OF THE PHYSICAL FACILITY POINTS ON THE CARDS, OR VIRTUAL PORTS IN THE CASE OF SUB-RATE MANAGED PORTS. A PORT BELONGS TO ONE NODE. A PORT CAN BELONG TO ONE CARD (OR MAY DIRECTLY BELONG TO THE NODE), IF A PORT IS PROTECTED, IT WILL INCLUDE A PROTECTION TYPE. A PORT HAS ONE TRANSPORT TYPE. A PORT CAN BELONG TO ONE RING. A PORT CAN BELONG TO ONE LINK. A PORT CAN SPECIFY IF IT IS BI-DIRECTIONAL, TRANSMIT ONLY, OR RECEIVE ONLY. |
| v_ConnectionAssociation | A VIEW OVER THE ASSOCIATED DATA OF A CONNECTION. UVNS-ONEVU OPTICAL PROVIDES THE ABILITY TO STORE USER-DEFINED DATA TO ASSOCIATED NON-UVNS-ONEVU-MANAGED CONNECTIONS WITH UVNS-ONEVU-MANAGED CONNECTIONS. |
| v_PortAddInfo | THIS VIEW CONTAINS THE DATA COLLECTED DURING ETHERNET PORTS DISCOVERY OF NORTEL3500 NODES. IT COBTAINS ETHERNET LAN AND WAN PORT INFORMATION UNDER THE OPE CARDS. |

FIG. 13B    LAYER 1 ACQUIRED OPTICAL INFORMATION (CONTINUED FROM FIG. 13A)

| PARAMETER | DEFINITION |
|---|---|
| v_Link | CONTAIN THE LINKS PRESENT IN THE NETWORK. A LINK REPRESENTS A FIBER BETWEEN A PAIR OF EQUAL-BANDWIDTH PORTS ON DIFFERENT NODES. A LINK WILL HAVE A FROM PORT AND A TO PORT. A LINK WILL HAVE A TRANSPORT TYPE THAT IS COMMON BETWEEN THE 2 PORTS. A LINK CAN BE MANY CONNECTION PATHS. A LINK CAN BE USED IN A RING PATH |
| v_CrossConnect | PROVIDES DATA THAT IS SPECIFIC TO A CROSS CONNECT ALSO KNOW AS A STEP TYPE NAME OF "XCNodes". THE CROSS CONNECT DATA CAN BE DIFFERENT THAN WHAT IS SHOWN IN THE CONNECTION PATH DATA. FOR EXAMPLE, A CROSSCONNECT THAT IS FOR UPSR MAY HAVE 1-Aport AND 2-Zports WHERE IT DIVERGES AND 2-Aports AND 1-Zport WHERE IT CONVERGES. IN V_ConnectionPath, THIS WILL BE SHOWN AS 1-A AND 1-Z FOR WORKING PATH AND 1-A AND 1-Z FOR PROTECT PATH. V_CrossConnect WILL CONTAIN THE ACTUAL CROSS CONNECT DATA AS REPORTED BY THE NODE. |
| v_Ring | CONTAIN A VIEW OF THE RINGS WHERE EACH ROW DESCRIBES A RING ON THE NETWORK, GIVING ITS TYPE OF RING, NAME, AND DESCRIPTION. |
| v_RingPath | PROVIDE THE PORTS AND LINKS THAT MAKE UP THE PATH FOR BLSR2, BLSR4 AND MSSP RINGS, SIMILAR TO THAT OF CONNECTIONS. TWO PATHS ARE GIVEN; THE WORKING PATH, AND THE PROJECT PATH. IN A BLSR2 RING, THE ONLY DIFFERENCE IN THESE PATHS WILL BE THE SET OF CHANNELS USED, EACH STEP THROUGH THE RING WILL HAVE TWO ROWS IN THE VIEW, ONE WITH AN ORIENTATION CODE OF A, AND ONE WITH AN ORIENTATION CODE OF Z INDICATING FROM/TO FOR EACH CROSS CONNECT OR LINK. THE FIRST FIVE FIELDS IN THIS VIEW REPRESENT A UNIQUE ROW. |
| v_RingPort | A VIEW OF THE RING/PORT RELATIONSHIP, WHERE EACH ROW DESCRIBES A PORT ON A RING |
| v_RingLink | A VIEW OF THE RING/LINK RELATIONSHIP, WHICH EACH ROW DESCRIBES A LINK ON A RING |

FIG. 14   VIEW OVER LAYER 2 DATA TABLES

| PARAMETER | DEFINITION |
|---|---|
| v_EQINV | THIS VIEW CONSISTS OF INFORMATION THAT UVNS ONE Vu RETRIEVES FROM THE NETWORK DURING THE DISCOVERY OF E SERIES & ML SERIES CARD FOR CISCO 15454 NODES AND OPE CARD FOR NORTEL 3500 NODES. THE CARDID FIELD IN TABLE REFERS TO THE CARDID FIELD IN THE TABLE V_CARD. |
| v_EQINVADDINFO | THIS VIEW CONSISTS OF THE ADDITIONAL PARAMETERS RETRIEVED FROM THE NE (CTM) DURING EQUIPMENT DISCOVERY OF CISCO 15454 DEVICES. THESE ARE VENDOR SPECIFIC ATTRIBUTES, WHICH CONTAINS ADDITIONAL INFORMATION ABOUT THE EQUIPMENT |
| v_PTPINV | THIS VIEW CONTAINS THE INFORMATION RETRIEVED BY UVNS ONEVU FROM THE NETWORK DURING THE PTP DISCOVERY. THE PORTID FIELD IN THE FOLLOWING TABLE CORRESPONDS TO THE PORTID FIELD IN THE V_PORT TABLE |
| v_PTPINVTRANSPARM | THIS VIEW HOLDS THE LIST OF TRANSMISSION PARAMETERS THAT ARE RETRIEVED ON THE TP AT A SPECIFIED LAYER AND AS A PART OF THE PROCESS OF DISCOVERING THE PTPs SUPPORTED BY THE EQUIPMENT IN THE NETWORK. THIS TABLE IS POPULATED FOR CISCO 15454 DEVICES ONLY. |
| v_L2TOPOINV | THIS VIEW CONTAINS ALL THE INFORMATION ABOUT THE L2Topologies RETRIEVED FROM THE NE. |
| v_L2TOPOINVADDINFO | THIS VIEW CONTAINS ADDITIONAL INFORMATION ABOUT THE L2 TOPOLOGY WHICH IS NOT EXPLICITLY MODELED AND RETRIEVED FROM THE NE DURING THE PROCESS OF L2 TOPOLOGY DISCOVERING. APPLICABLE FOR CISCO 15454 DEVICES ONLY. |
| v_Port_Relationship | THIS TABLE WILL HOLD THE RELATIONSHIP BETWEEN ETHERNET PORTS & NETWORK INTERFACING PORT FOR NORTEL 3500 AND CISCO 15454 DEVICES. |
| v_MLVLANINV | THIS VIEW CONTAINS ALL THE INFORMATION RETRIEVED FROM THE NE DURING THE PROCESS OF MLVLAN/SERVICE PROVIDER VLAN DISCOVERY. |
| v_MLVLANINVADDINFO | THIS VIEW CONTAINS ADDITIONAL PARAMETERS RETRIEVED FROM THE NE (CTM) DURING THE PROCESS OF MLVLAN DISCOVERY. APPLICABLE TO CISCO 15454 DEVICES ONLY. |
| v_MLVLANINVTPLIST | THIS VIEW HOLDS THE DATA CORRESPONDING TO THE LIST OF THE ETHERNET PORTS ASSOCIATED WITH THE MLVLAN OR SERVICE PROVIDER VLAN |

FIG. 14 (CONTINUED)

VIEW OVER LAYER 2 DATA TABLES

| PARAMETER | DEFINITION |
|---|---|
| v_MLVLANINVQOSPOLICYDATA | THIS VIEW HOLDS THE INFORMATION ABOUT THE QOS POLICY CLASS NAMES AND POLICER THAT WILL BE USED AGAINST THE PARTICULAR QOS CLASS AND MLVLAN OR ServiceProvider VLAN. |
| v_MLVLANINVQOSMATCHPROTOCOL | THIS VIEW HOLDS THE DATA ABOUT THE QOS POLICIES SUPPORTED BY THE DISCOVERED MLVLAN. APPLICABLE TO CISCO 15454 NODES ONLY. |
| v_CUSTOMERVLAN | THIS VIEW CONTAINS CUSTOMER VLAN INFORMATION FOR NORTEL 3500 DEVICES ONLY. |
| v_NNITruckGroupData | THIS VIEW CONTAINS THE NNI REDUNDANCY DATA FOR NORTEL 3500 NODES ONLY |

FIG. 15

CONNECTIONS

| PARAMETER | DEFINITION |
|---|---|
| v_Connection | A VIEW PROVIDES THE DATA FOR EVERY CONNECTION THAT UVNS-ONEVU IS AWARE OF. THIS DATA INCLUDES THE BEGINNING AND END POINTS, BUT DOES NOT INCLUDE THE PATH IT TRAVERSES, AS THAT IS THE ROLE OF v_ConnectionPath. A CONNECTION MAY BE ASSOCIATED WITH ONE CUSTOMER. A CONNECTION WILL HAVE AN APort (FROM) AND A ZPort (TO), ALTHOUGH THEY MAY BE NULL IN LOOPED CONNECTION SCENARIOS. IN CASES WHERE THERE ARE MORE THAN ONE APort OR ZPort, THE FIRST ONE IN THE LIST IS REPORTED WHICH MATCHES WHAT THE UVNS-ONEVU DISPLAY. A CONNECTION WILL HAVE ON TRANSPORT TYPE ASSOCIATED WITH EACH PORT, ALONG WITH THE BANDWIDTH AND UOM (UNIT OF MEASURE) FOR THE BANDWIDTH FOR BOTH THE APort AND ZPort. |
| v_ConnectionPath | A VIEW OVER THE DATA THAT IDENTIFIES THE PATH, INCLUDING LINKS, THAT A CONNECTION TRAVERSES. IF A CONNECTION "USES" ANOTHER CONNECTION, THE CONNECTION WILL INCLUDE ALL THE STEPS OF THE UNDERLYING CONNECTION IN ITS PATH. THUS, IT IS A FLATTENED VIEW OF THE ENTIRE PATH. EACH CONNECTION STEP (LINK, CROSS CONNECT, ETC.) WILL HAVE TWO ROWS IN THE VIEW, ONE WITH AN ORIENTATION CODE OF *from* AND ONE WITH AN ORIENTATION CODE OF *to*. ALTHOUGH A PROVISIONED CROSS CONNECT MAY HAVE MORE THAN ONE *from* AND ONE *to* (LIKE IN THE CASE OF UPSR) SPLITS AND JOINS), IT WILL NOT HAPPEN IN THE CASE OF THE CONNECTION PATH DATA IN THIS VIEW, AS THE PATH DEPICTS A SINGULAR PATH. THE FIRST 5 FIELDS IN THIS VIEW MAKE A UNIQUE ROW. |
| v_Port_Relationship | THIS TABLE WILL HOLD THE RELATIONSHIP BETWEEN ETHERNET PORTS & NETWORK INTERFACING PORT FOR NORTEL 3500 AND CISCO 15454 DEVICES |
| v_Customer | CONTAIN INFORMATION REGARDING THE CUSTOMERS THAT OWN CONNECTIONS IN THE NETWORK. A CUSTOMER MAY BE ASSOCIATED WITH MANY CONNECTIONS |
| v_NODE_I2TOPOLOGY | THIS TABLE SERVES AS A RELATIONSHIP HOLDER BETWEEN THE V_NODE AND V_TOPOINV TABLE AND CAN BE USED TO OBTAIN THE LIST OF NODEID'S FOR A GIVEN I2TOPOID OR A SET OF I2TOPONAMES AND ID FOR A GIVEN NODEID. |
| v_ObjectHistory | A VIEW THAT TRACKS THE STORED PROCEDURE NAME, DATA EXECUTION WAS REQUESTED, DATA EXECUTION WAS COMPLETED AND USER WHO REQUESTED THE STORED PROCEDURE EXECUTION. THESE ARE NO CURRENT STORED PROCEDURES WHERE THIS IS USED, BUT IT IS PROVIDED FOR FUTURE USE. |

VERTICAL INTEGRATION OF NETWORK MANAGEMENT FOR ETHERNET AND THE OPTICAL TRANSPORT

BACKGROUND OF THE INVENTION

The invention relates generally to network communications management. More specifically, the invention relates to systems and methods for vertically integrating network management capabilities across various transport layers such as Synchronous Optical Networking/Wavelength Division Multiplexing (SONET/WDM), Layer 2 Ethernet, and Virtual Local Area Networks (VLANs).

Traditional telecommunications network Operation Support Systems (OSS) are developed to manage specific transports and/or functional domains. Network management of traditional telecommunication services would require coordination of multiple work-centers and information correlation among multiple OSS management systems. This OSS management paradigm may be sufficient for network services that can afford long cycle time in adopting new technology and have regular requirements on customer Service Level Agreements (SLAs).

Availability of metro-optical equipment and the emergence of Resilient Packet Ring (RPR) technology over the past several years have enabled a niche market for a high availability Metropolitan Area Network (MAN) to support high bandwidth and secure transport in meeting the network demands of mid-size and large enterprise customers. These network services often have demanding SLAs and require exceptional response time in customer care. Current OSSs within traditional network management paradigms cannot meet the management needs of this niche market.

FIG. 1 shows an optical SONET/Dense WDM (DWDM) transport (solid lines) with a provisioned SONET path (ring) (broken lines) originating at a source ring A and ending at a destination ring Z transporting Ethernet. A SONET path originates on an A port and terminates on a Z port, where a port is part of a node and the node is part of the ring. Typically, network event and alarm information and network discovery are captured in different OSS systems requiring an operator to use disjointed systems and manually correlate information between the two layers for network management needs. FIG. 2 shows the SONET/Ethernet transport, with the addition of provisioned VLANs adding another layer of information. The branches represent the LANs, for example, in the customer locations that feed the VLAN traffic over the network for WAN/MAN transport from one customer location to another. FIG. 3 shows the optical transport experiencing a fault—a fiber break at destination ring Z.

Using a traditional network management system, it may not be possible to easily observe VLAN resources from the source ring A to destination ring Z. Additionally, if a fiber break occurs, it would be difficult to observe how alarms associated with the fiber break appear across the three vertical domains. For example, will alarms annunciated from VLAN resources indicate an optical failure?

What is desired is a management system and method that vertically integrates management capabilities across various transport domains in a single platform to support end-to-end (E2E) network management needs and optimizes operational efficiency and network management cost in the niche market of high bandwidth metropolitan network services.

SUMMARY OF THE INVENTION

The inventors have discovered that it would be desirable to have systems and methods that vertically integrate telecommunications network management across multiple transport domains and network layers to support E2E network management. Embodiments vertically integrate telecommunications network management across multiple transport layers such as physical layers (optical), data link layers (Ethernet), and upper layers (VLAN), and establish an inventory database for the plurality of transport layers in a network management OSS to integrate and correlate network alarms and other business applications. Embodiments provide a single platform for an E2E network management solution across and for multiple transport domains.

The systems and methods define a framework for managing a telecommunications transport network. The framework inventories network equipment, cards, ports, circuits, rings, and other network entities. The framework is enhanced with specific transport characteristics for target technologies such as SONET, WDM, Layer 2 Ethernet, VLAN, and others that include technology specific data, such as wavelength management for WDM; Time-Division Multiplexing (TDM), Synchronous Transport Signal (STS) Virtual Tributary (VT), and/or VT Group (VTG) management for SONET; RPR for Ethernet; QoS management for VLAN, and specific methods for implementing Local Area Network/Wide Area Network (LAN/WAN) network management.

The systems and methods define rules for alarm correlation and management for each transport domain, and for cross domain correlation between the various transports. The framework is customized with specific attributes that address the rules and processing methods. The systems and methods process data for vertical management applications that include an alarm surveillance dashboard across the multiple transport domains, performance management reports across the different technologies, and asset management and capacity management reports on the common/shared network resources. Depending on the technology and supplier equipment, the framework may collect data from NEs directly, via a gateway NE, or via an EMS. For example, data may be retrieved from an EMS on CISCO computing equipment support Layer 2 Ethernet. In another example, data is retrieved from NEs on the same CISCO computing equipment that supports SONET/DWDM transports, with a different card. Technologies refer to the different transport methods, DWDM, SONET, DSX, Ethernet, etc.

One aspect of the invention provides a method for vertically integrating telecommunications network management across multiple transport domains and network layers to support end-to-end network management. Methods according to this aspect of the invention include establishing a network inventory database for Layer 1 optical network devices in a managed domain, discovering all Ethernet cards from the managed domain, discovering all ports on the Ethernet cards, discovering all Layer 2 topologies in the managed domain, discovering all VLANs in the managed domain, and creating an inventory database of key relationships between the Layer 2 information (discovered Ethernet ports, Layer 2 topology, and Virtual Local Area Networks (VLANs)) and the Layer 1 optical network.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIGS. 13A and 13B is an exemplary representation of Layer 1 information acquired.

FIG. 14 is an exemplary representation of Layer 2 information acquired.

FIG. 15 is an exemplary representation of the cross domain information established by correlation.

DETAILED DESCRIPTION

Figure 1:
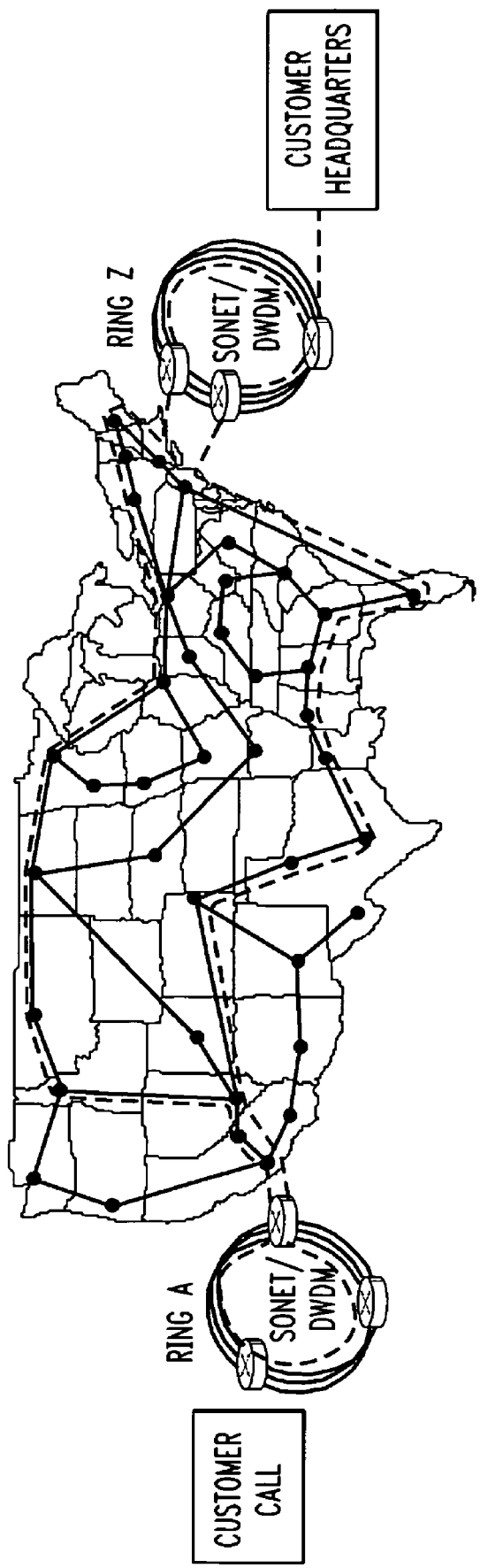
FIG. 1 is an exemplary SONET/DWDM path from a source ring A to a destination ring Z.

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling.

Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks, and a computer-usable medium storing computer-readable instructions for vertically integrating telecommunications network management across multiple transport domains and network layers to support E2E network management. The invention is a modular framework and is deployed as software as an application program tangibly embodied on a program storage device. The application code for execution can reside on a plurality of different types of computer readable media known to those skilled in the art.

By way of background, SONET is primarily used by telecommunications carriers as the underlying transport mechanism for networking. As such, SONET is widely deployed in both the internal telecommunications switching networks and the trunk networks owned by long-distance carriers. SONET is used in the enterprise environment mainly as the underlying transport for high-speed WAN connections.

SONET transmission is generally built from multiplexed DS0, DS1, or DS3 digital signal channels. SONET employs optical TDM technologies to form a single STS link that is demultiplexed at the receiving end. SONET transports LAN traffic such as GbE frames by encapsulating them within SONET frames.

SONET is typically implemented in telecommunications networks as a dual-ring topology in order to provide redundancy and fault tolerance. One ring is the active ring and carries traffic in one direction only. The backup ring remains inactive unless a break in the primary ring occurs, in which case the backup ring takes over and carries traffic in the opposite direction. SONET rings use a self-healing technology called Automatic Protection Switching (APS) that can detect when the active ring is broken and switch traffic to the backup ring.

RPR is a packet-based protocol that provides fault tolerance and statistical multiplexing for the metropolitan and national SONET and Ethernet networks of the carriers. The RPR architecture is often added to SONET networks to enable them to carry packets. RPR is a Layer 2 protocol that uses dual counter-rotating rings for fault tolerance. RPR employs both rings of the SONET infrastructure to carry traffic simultaneously. Should one ring fail, its portion of traffic is automatically switched to the second ring. Since this switchover could result in sudden congestion of traffic, RPR employs Quality of Service (QoS) in order to differentiate between voice traffic, which needs high priority due to its sensitivity to delay, and Internet Protocol (IP) packet traffic, which can be assigned low priority since it is less sensitive to delay.

RPR ringlets are set up by creating RPR stations at nodes where traffic is supposed to drop, per flow. RPR uses Media Access Control (MAC) protocol messages to direct the traffic, which traverses both directions around the ringlet. The nodes also negotiate for bandwidth among themselves using fairness algorithms, avoiding congestion and failed spans. RPR nodes, which contain the RPR interface cards, are typically routers and switches in a packet environment such as Ethernet, or Add/Drop Multiplexers (ADMs) in a TDM environment such as SONET.

A VLAN is a group of ports on an Ethernet switch that behaves like a separate network segment. VLANs allow networks to be segmented logically without having to be physically rewired. Instead of having all ports on a switch be equal and belong to the same network, ports can be segregated into groups, each belonging to a separate logical network. Administrators can easily make these port assignments indicating which VLANs are mapped to which ports by accessing the software for the switch.

VLANs make switched Ethernet networks more bandwidth-efficient through this segmentation of broadcast domains. The ability to reconfigure ports logically without needing to unplug wires and move them around.

A VLAN is identified using a special identification number referred to as a VLAN ID. Stations attached to switch ports having the same VLAN ID act and function as though they are all on the same physical network segment. Broadcasts sent by one host are received only by hosts connected to ports having the same VLAN ID as the sending host. A single VLAN can span multiple switches connected together. By using a method called trunking, VLAN-enabled switches can be connected to form large VLANs spanning switches right across the enterprise. To effect this, a port on the switch must be designated a trunk port, and trunk ports on different switches are connected using trunk lines.

Switch vendors have traditionally developed their own proprietary VLAN technologies. CISCO computing equipment CATALYST switches employ several types of technologies in order to implement enterprise VLANs, namely frame tagging, Inter Switch Link (ISL), and VLAN Trunking Protocol (VTP).

An issue is that of address management of stations on the network. VLANs were originally designed to simplify the management of hosts on the network by using their Layer 2 MAC addresses to identify them to switches. When a computer is unplugged from a LAN drop and moved to a different physical location and plugged-in to a different drop, VLAN switches can automatically detect the computer's new location by its MAC address and reconfigure themselves dynamically.

The system frameworks and methods of the invention provide a single platform for consolidated management of the above transport domains and layers, and reduce administrative cost for system maintenance. Embodiments obviate the manual tasks of using multiple systems, each for managing the separate domains and layers, and the manual correlations required across the multiple domains and layers for troubleshooting or other maintenance activities.

Figure 4:
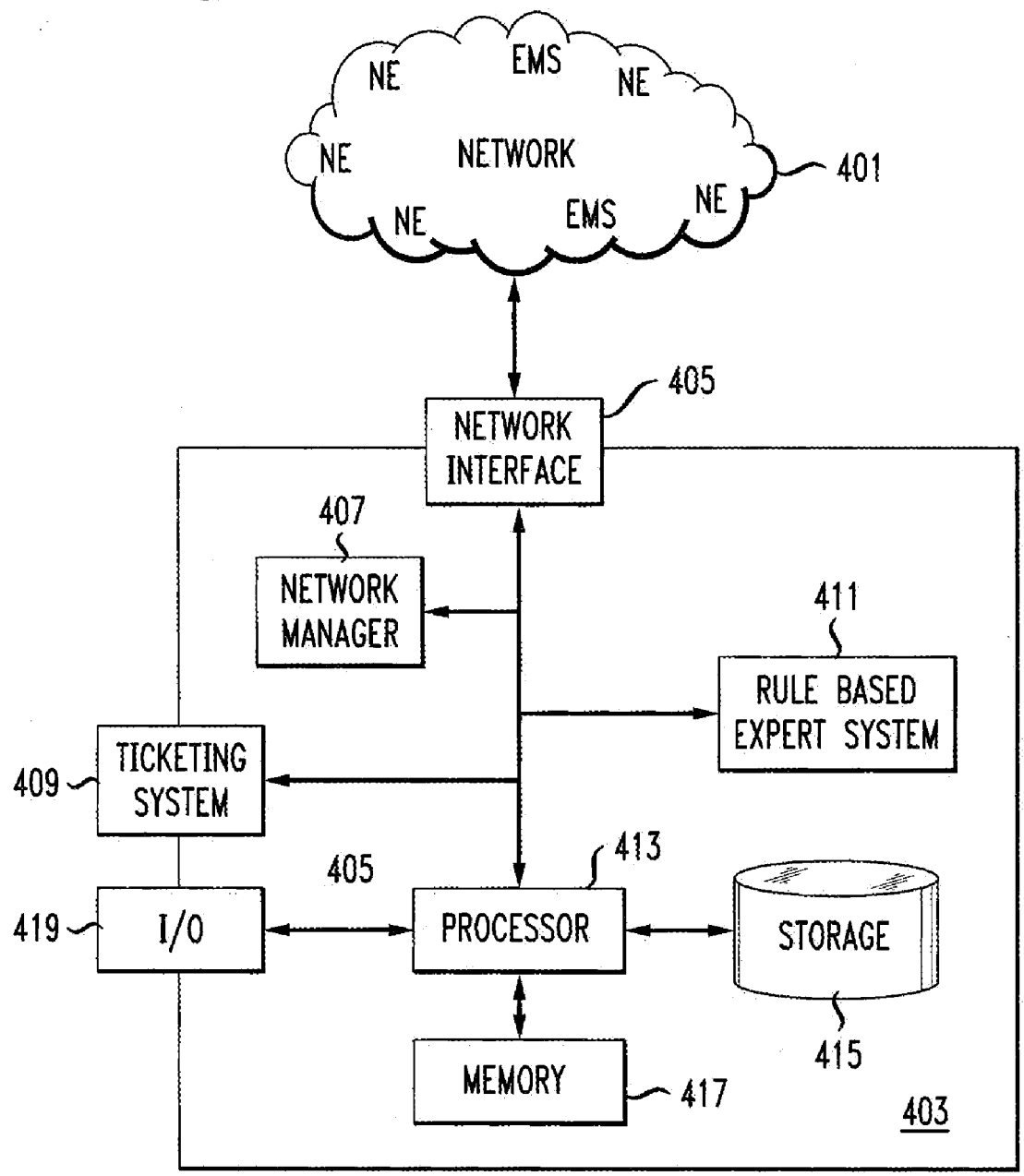
FIG. 4 is an exemplary system framework.
Figure 5:
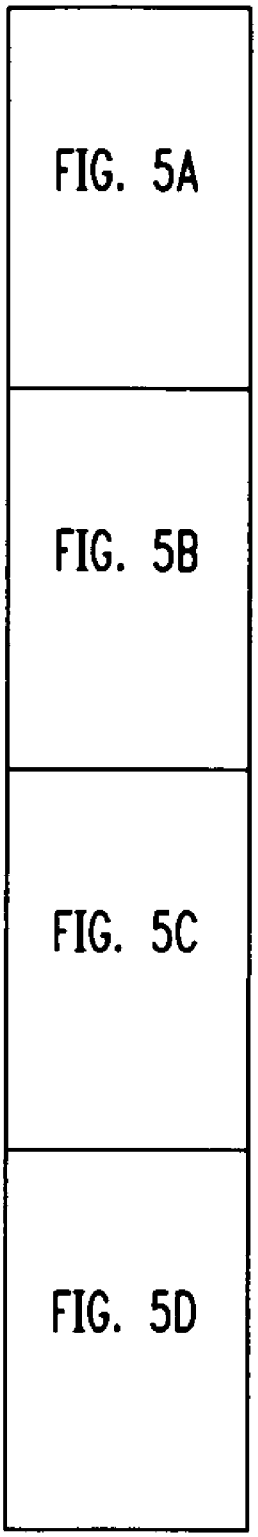
FIG. 5 is an exemplary method for vertically integrating optical transport, Ethernet, and VLAN information into an inventory database of key relationships.
Figure 5A:
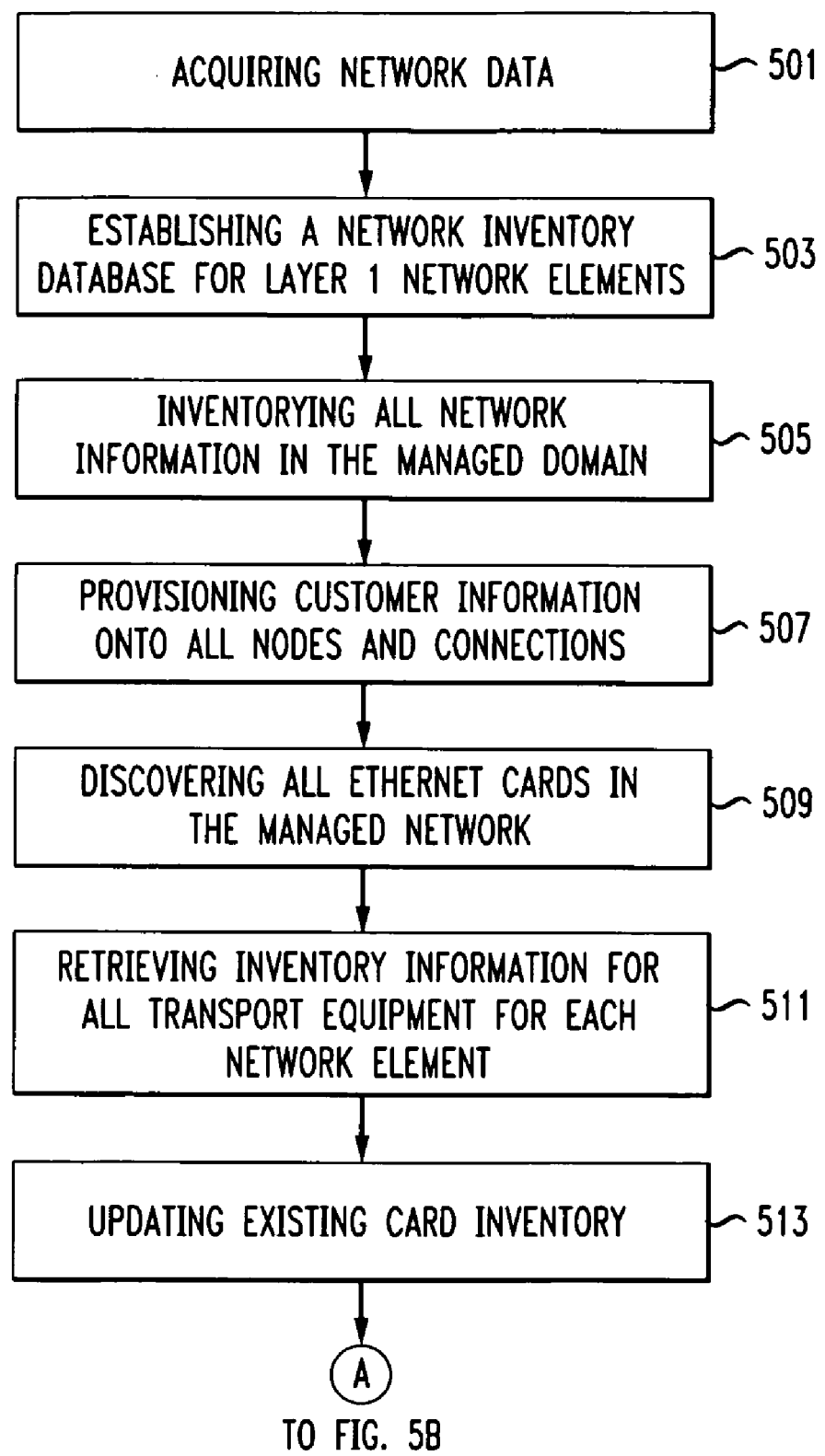
Figure 5B:
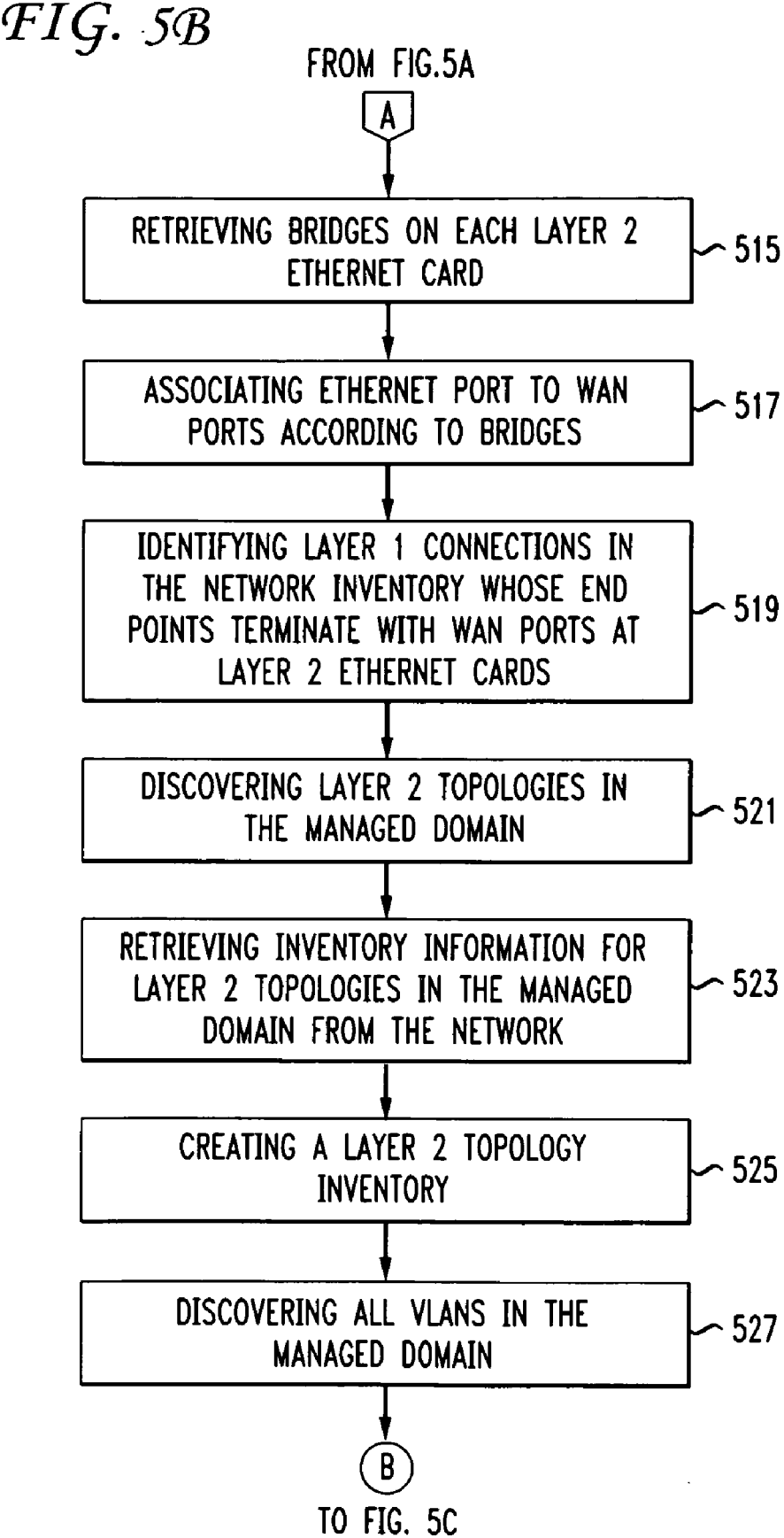
Figure 5C:
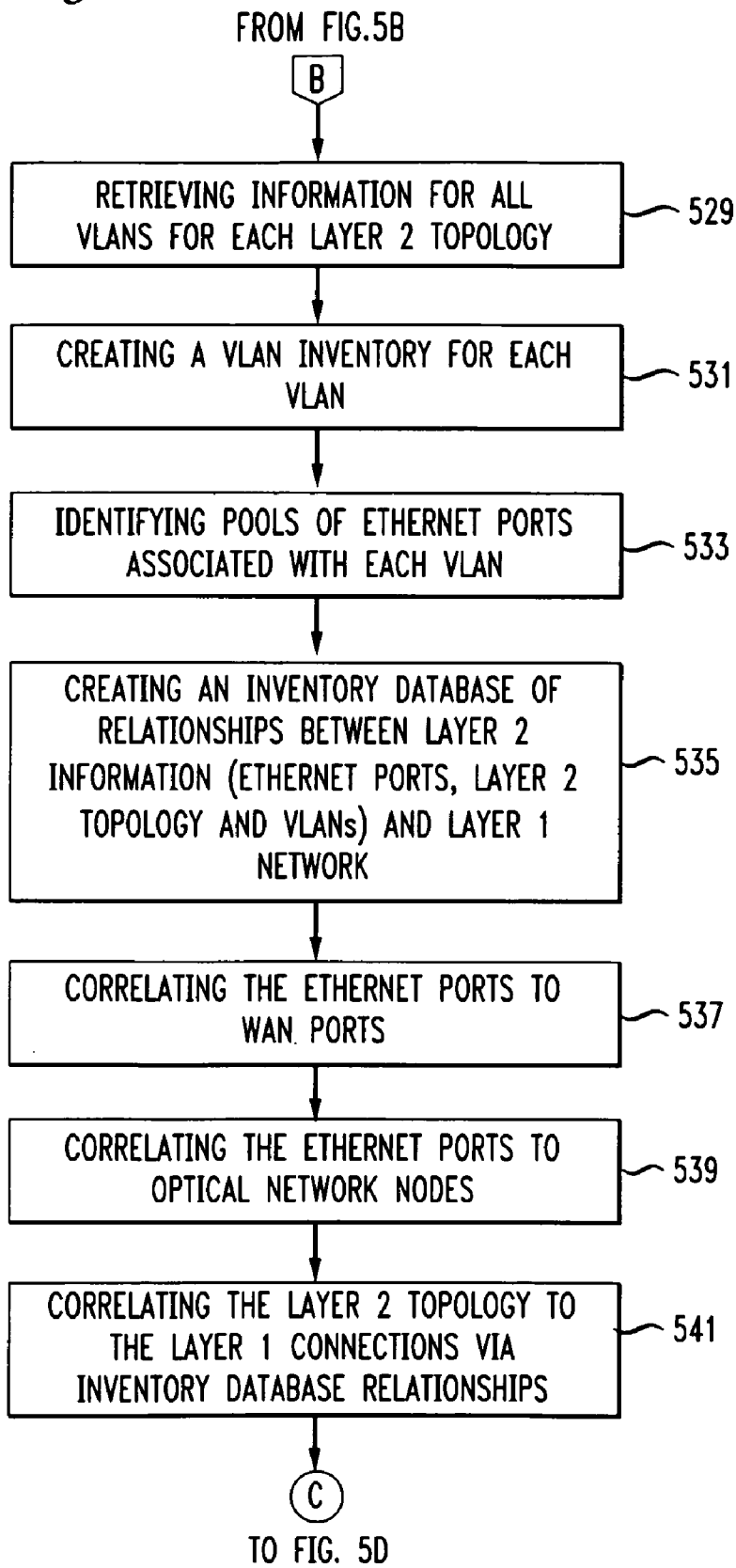

FIG. 4 shows an embodiment of a system 401 framework 403 and FIG. 5 shows a method. The framework 403 includes a network interface 405 coupled to a network and configured to acquire network topology information, network alarm data, such as for provisioned facilities from Element Management Systems (EMSs), and issue TL1 commands to acquire network data from provisioned facilities via the TL1 commands for the optical subnetworks. An EMS manages one or more NEs and the features of each NE individually. NEs expose one or more management interface that the EMS uses to communicate with and to manage them. The management interfaces use a variety of protocols including SNMP, TL1, CL1, XML, and CORBA. The network interface 405 is coupled to a network manager/inventory database 407, a ticketing system 409, a Rule Based Expert System (RBES) 411 and a processor 413. The processor 413 is coupled to storage 415, memory 417 and I/O 419.

The framework 403 assembles a database 407 from the acquired data and stores the data as a connection traverses from a source node to a destination node. For example, a path connection for a customer may be provisioned from Los Angeles, Calif. to New York City, N.Y., establishing Los Angeles as the source node (A) and New York City as the destination node (Z). During path provisioning, a plurality of intervening SONET/SDH sections and optical DWDM subnetworks may be employed between the two path terminating nodes. The inventory database 407 maintains all path connection information and the identity of each NE in the path.

Polled in predetermined time periods, and/or on-demand, using TL1 commands for target network resources issued by the network manager 407, or acquired via the EMS(s), network and alarm data are acquired for analysis. In addition, network alarms are transmitted asynchronously to the network manager 407 in real-time as network faults occur in the network.

The framework 403 may be implemented as a computer including a processor 413, memory 417, storage devices 415, software and other components. The processor 413 is coupled to the network interface 405, I/O 419, storage 415 and memory 417 and controls the overall operation of the computer by executing instructions defining the configuration. The instructions may be stored in the storage device 415, for example, a magnetic disk, and loaded into the memory 417 when executing the configuration. The invention may be implemented as an application defined by the computer program instructions stored in the memory 417 and/or storage 415 and controlled by the processor 413 executing the computer program instructions. The computer also includes at least one network interface 405 coupled to and communicating with a network such as shown in FIG. 1 to interrogate and receive network configuration or alarm data. The I/O 419 allows for user interaction with the computer via peripheral devices such as a display, a keyboard, a pointing device, and others. The ticketing system 409 is configured to issue maintenance tickets depending on the conclusions yielded by the RBES 411 regarding the health of a customer's provisioned path.

Figure 2:
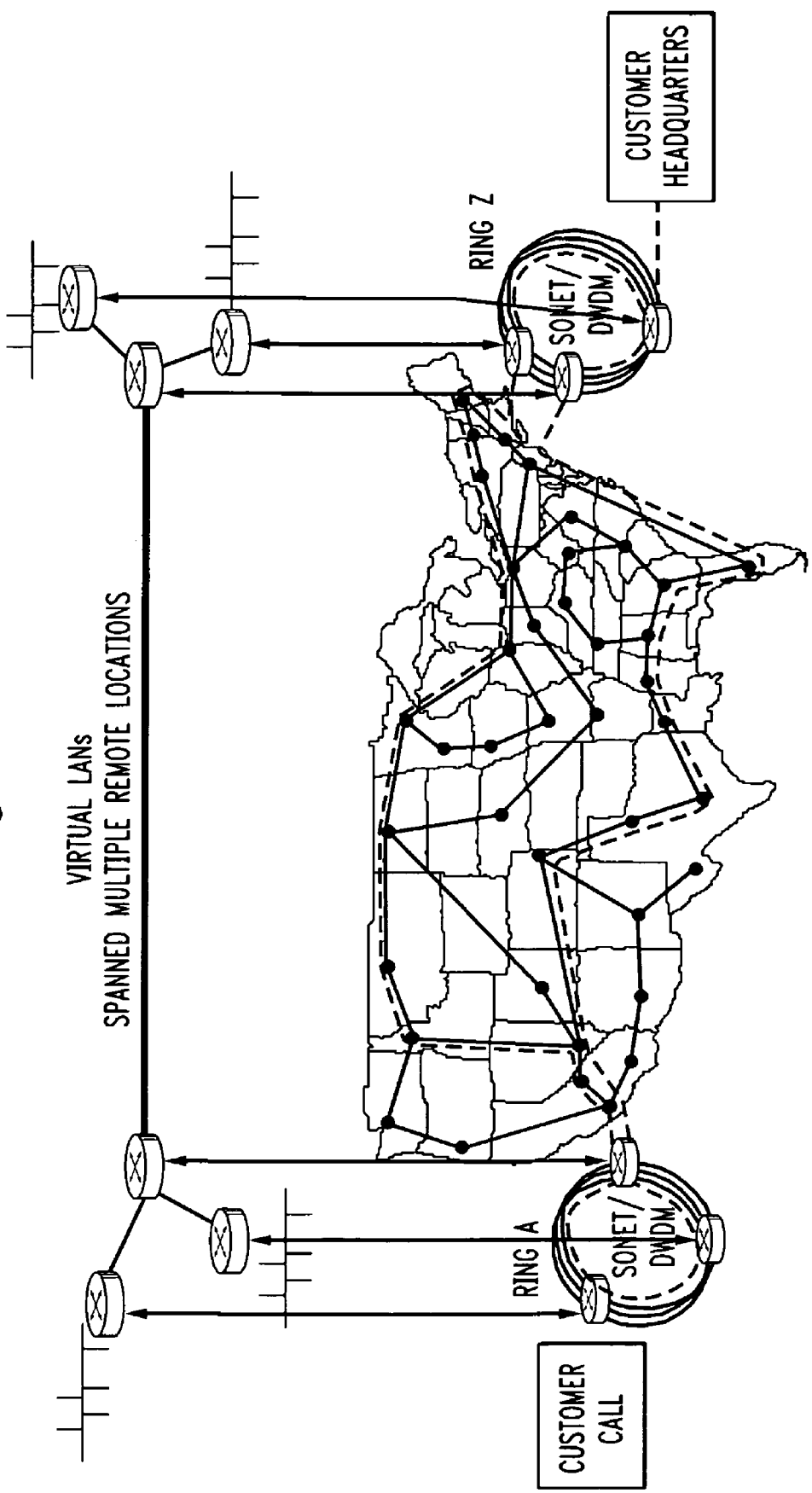
FIG. 2 is the exemplary SONET/DWDM path in FIG. 1 with provisioned VLANs.
Figure 3:
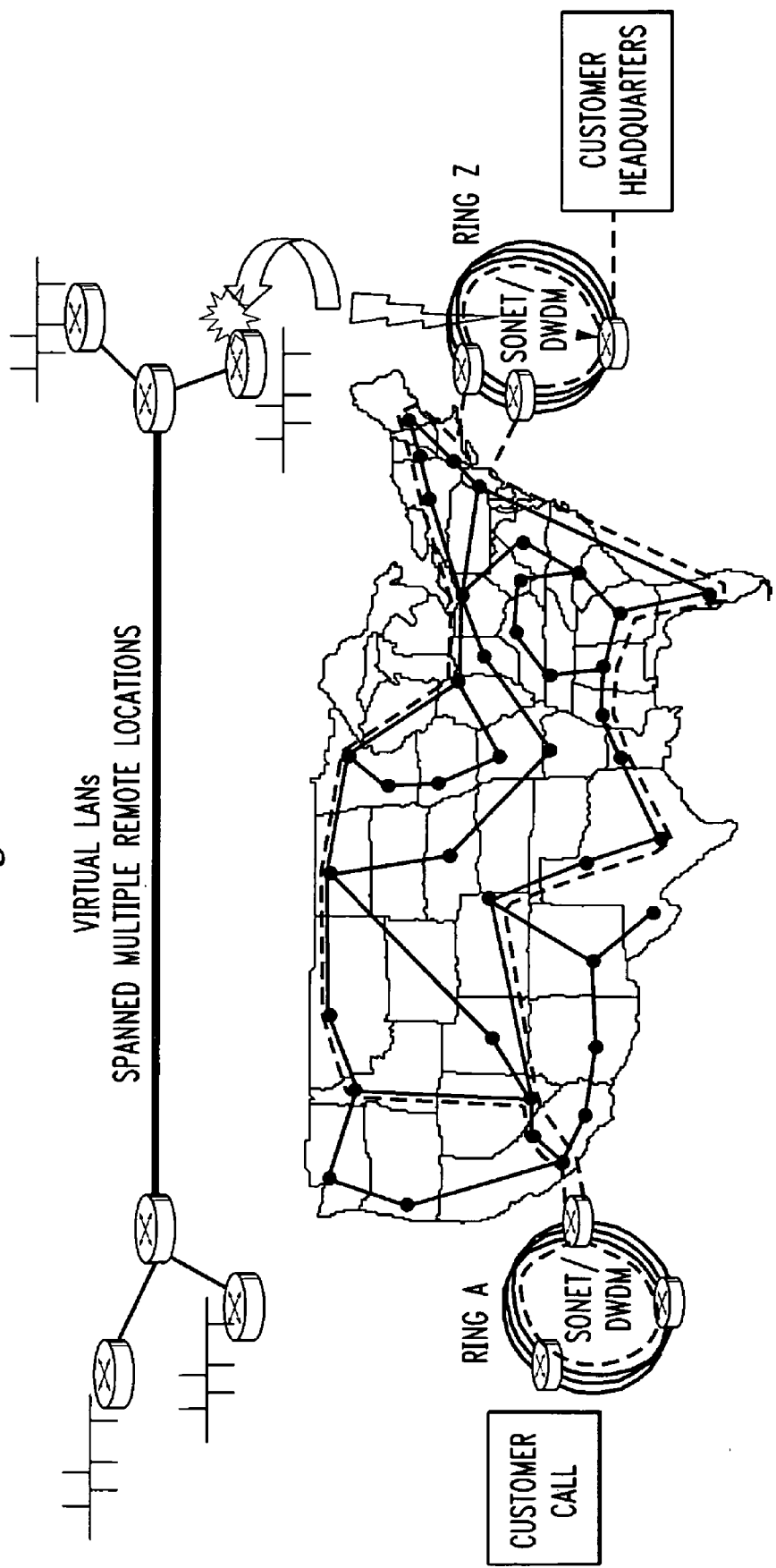
FIG. 3 is the exemplary SONET/DWDM path in FIG. 2 with provisioned VLANs experiencing a broken fiber at destination ring Z.

FIG. 2 shows a Layer 1 network topology (SONET/DWDM) transporting a Layer 2. The framework 403 performs a daily network audit/discovery to acquire network data using TL1 commands from EMSs and Network Elements (NEs) (step 501). The provisioning system stores the acquired data in a database with a predefined database schema (data model). The database may be employed by other business applications for running user on-demand reports, supporting autonomous alarm display and ticketing.

To vertically integrate the network management data across multiple transport domains and layers, a network inventory database for the Layer 1 NEs must be established (step 503). All of the network information in a managed domain is inventoried and correlated in the forms of rings, nodes, cards, ports, links, paths, connections, and the like (step 505). FIGS. 13A and 13B show a typical tabular representation of the Layer 1 information acquired. Customer information is provisioned onto all of the inventoried network information (step 507).

From the Layer 1 inventory database, all Ethernet cards are discovered (step 509). Inventory information from all transport equipment (NEs) in the managed domain is retrieved (step 511). Existing card inventory in the network is updated (step 513) where node identification equals the node name returned from the network. For a new card discovered in the network, a card inventory with the node identification that equals the node name returned from the network is created (step 513).

Figure 19:
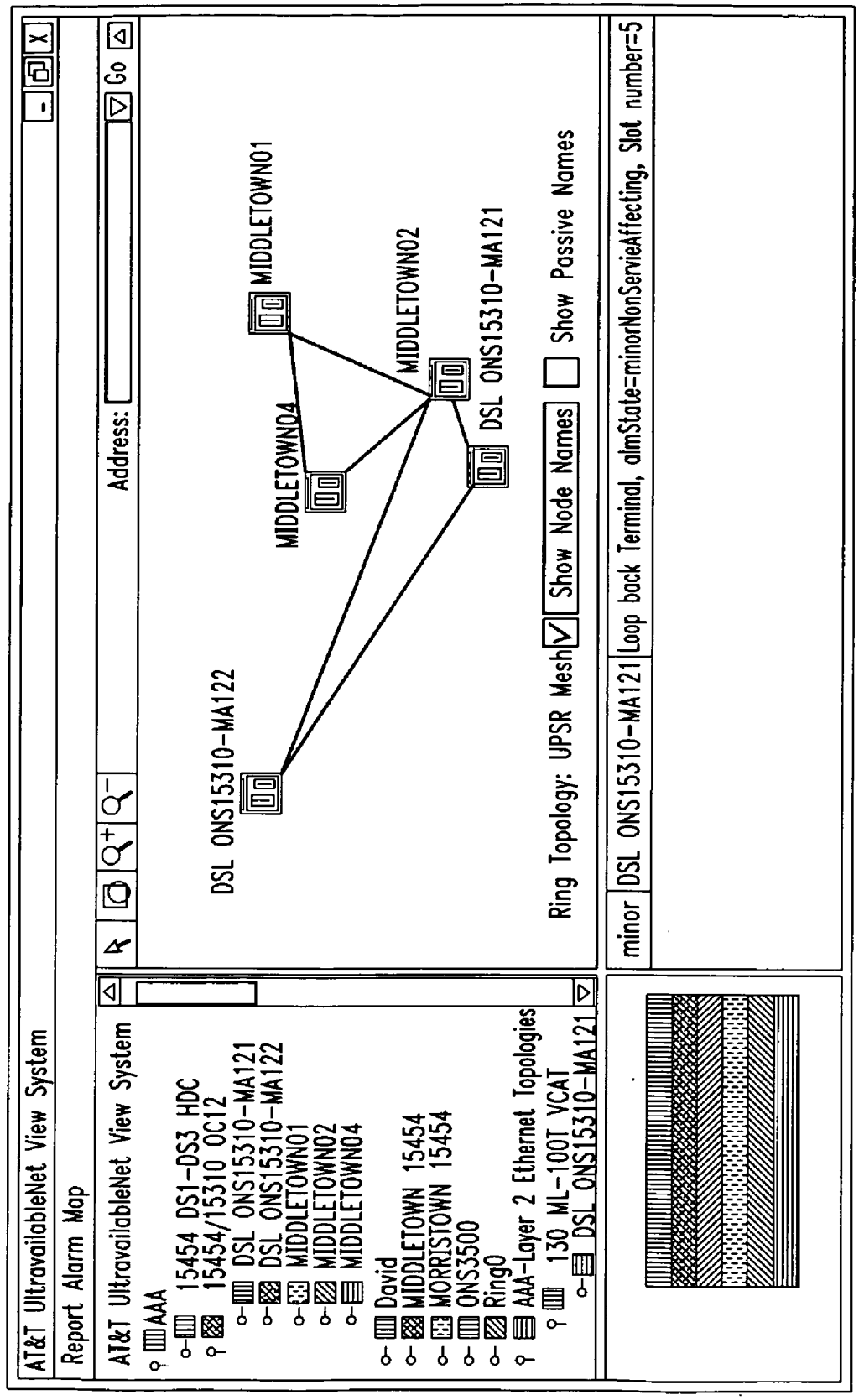
FIG. 19 is a browser window showing an exemplary SONET ring display.

Since all of the Layer 2 elements (Ethernet cards) are identified, all ports on the Ethernet cards are identified (step 515). For each Layer 2 Ethernet card, all ports such as Ethernet ports and WAN ports are retrieved from the inventory database 407. FIG. 14 shows a typical tabular representation of the Layer 2 information acquired. FIG. 19 shows a typical, user graphical representation of information captured during data acquisition. The existing port inventory is updated, whose card identification equals the card name returning from the network. If a new port is discovered in the network, creating port inventory with card identification equals the card name returning from the network (step 517).

From each Layer 2 Ethernet card, all bridges are retrieved (step 515). Ethernet port to the WAN port according to the bridge configuration is associated (step 517). A Layer 2 Ethernet may have multiple VLANs operating over it with VLAN traffic entering and exiting out of Ethernet/optical rings via Ethernet ports that reside at diverse geographical locations. Each Ethernet port supports a specific QoS profile to shape and groom traffic onto a particular VLAN.

The information across Layers 1 (physical—optical) and 2 (data link layer—Ethernet) are correlated. A Layer 2 Ethernet is interconnected by one or more optical circuits. Each circuit is terminated between two optical nodes at the trunk port/WAN port. From the Layer 2 discovery, the Layer 2 topology can relate to a WAN port. From the Layer 1 discovery, the system framework knows what connections are terminated at the trunk port. The system will relate the connections to the pertaining Layer 2 topologies by matching WAN and trunk ports.

For example, one customer may have multiple Layer 2 Ethernets running in the network. Network connections are discovered from the Layer 1 discovery. A user may assign a customer to the connection during the provisioning process for a Layer 1 network. The framework establishes the customer to a Layer 2 topology using induction from above.

All Layer 1 optical connections in the network inventory, whose end points reside at the terminating nodes are terminated with WAN ports at a Layer 2 Ethernet card are identified (step 519). The end points refer to the signal/traffic entry and exit points at the port level. The Layer 1 (physical—optical network) information is correlated with the Layer 2 (data link layer—Ethernet) information. For example, since one customer may have multiple Layer 2 Ethernets in place on the managed domain, each Layer 2 Ethernet is supported by one or more optical nodes and is interconnected by one or more optical circuits. An optical node supports many Ethernet/WAN ports. Each optical circuit is terminated between two optical nodes at a trunk port. VLAN traffic from an Ethernet port maps to the trunk ports for optical networking. During Layer 2 discovery, the Ethernet/WAN ports are returned with a data structure that contains the equipment hierarchy, for example, nodename, cardname, portname, and others. The framework matches the node and card information to establish node to port association in the inventory. FIG. 15 shows a typical tabular representation of the cross domain information established by correlation.

All Layer 2 topologies in the managed domain are identified (step 521). Inventory information of all Layer 2 topologies in the managed domain from the network (either through EMS or directly from each network element) is retrieved (step 523) and a Layer 2 topology inventory in the management database is created to store each Layer 2 topology (step 525).

The following equipment information for Layer 2 Ethernet is discovered by a provisioning system such as an EMS on a daily basis. Depending on the vendor equipment supported in a network, the actual protocols and methods used, for example, TL1 vs. SNMP vs. CORBA, and the data structure returned from the equipment may be different. However, the key data required by the OSS will be the following Layer 2 topology, or RPR, VLANs and the profile data, the Ethernet cards, and the pertaining Ethernet ports and WAN ports.

The method for discovery and data correlation among Layer 2 Ethernet would be different depending on the protocols and methods used by different NE vendors. However, the data returned by the network will be able to support the relationships which are defined to support the business applications.

All VLANs in the managed domain are discovered (step 527). Information of all VLANs for each Layer 2 topology is retrieved (step 529) from network/EMS through the network interface 405. A VLAN inventory is created to store each VLAN data (step 531). The pools of Ethernet ports associated with each of the VLANs are identified (step 533).

VLAN traffic from an Ethernet port bridges to the trunk/WAN ports for optical networking. The Ethernet-WAN port association is performed during the Layer 2 discovery of Ethernet and WAN Ports. The framework 403 supports network inventory through discovery. In the framework 403, network traffic will be effected via EMS or craft interface of the NEs prior to the discovery performed for the OSS inventory databasing. The OSS would inventory the association of the Ethernet and WAN ports to reflect the network traffic flow.

Figure 18:
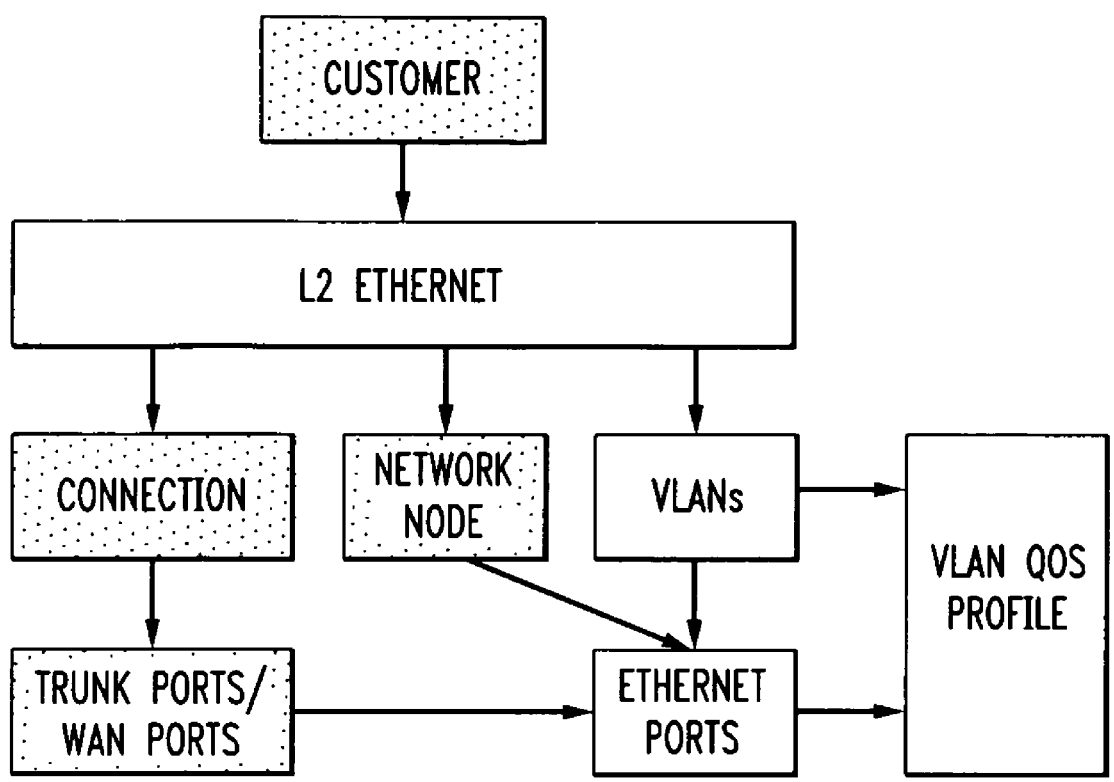
FIG. 18 is an exemplary transport/Ethernet/VLAN relationship correlation diagram.

An inventory database of key relationships between the Layer 2 information (discovered Ethernet ports, Layer 2 topology and VLANS) and the Layer 1 optical network is created (step 535). The Ethernet ports to WAN ports are correlated (step 537), the Ethernet ports to the optical node are correlated (step 539), the Layer 2 topology to the Layer 1 connections via the inventory database relationships (Layer 2 topology/VLANs/Ethernet ports/WAN ports/Connection) are correlated (steps 541, 543), and the Layer 2 topology to a customer via the inventory database relationships are correlated (Layer 2 topology/connections/customer) (steps 545, 547). FIG. 18 shows the correlation of the key relationships.

The following information methods may be performed as well as others using the assembled inventory database (407).

Figure 6:
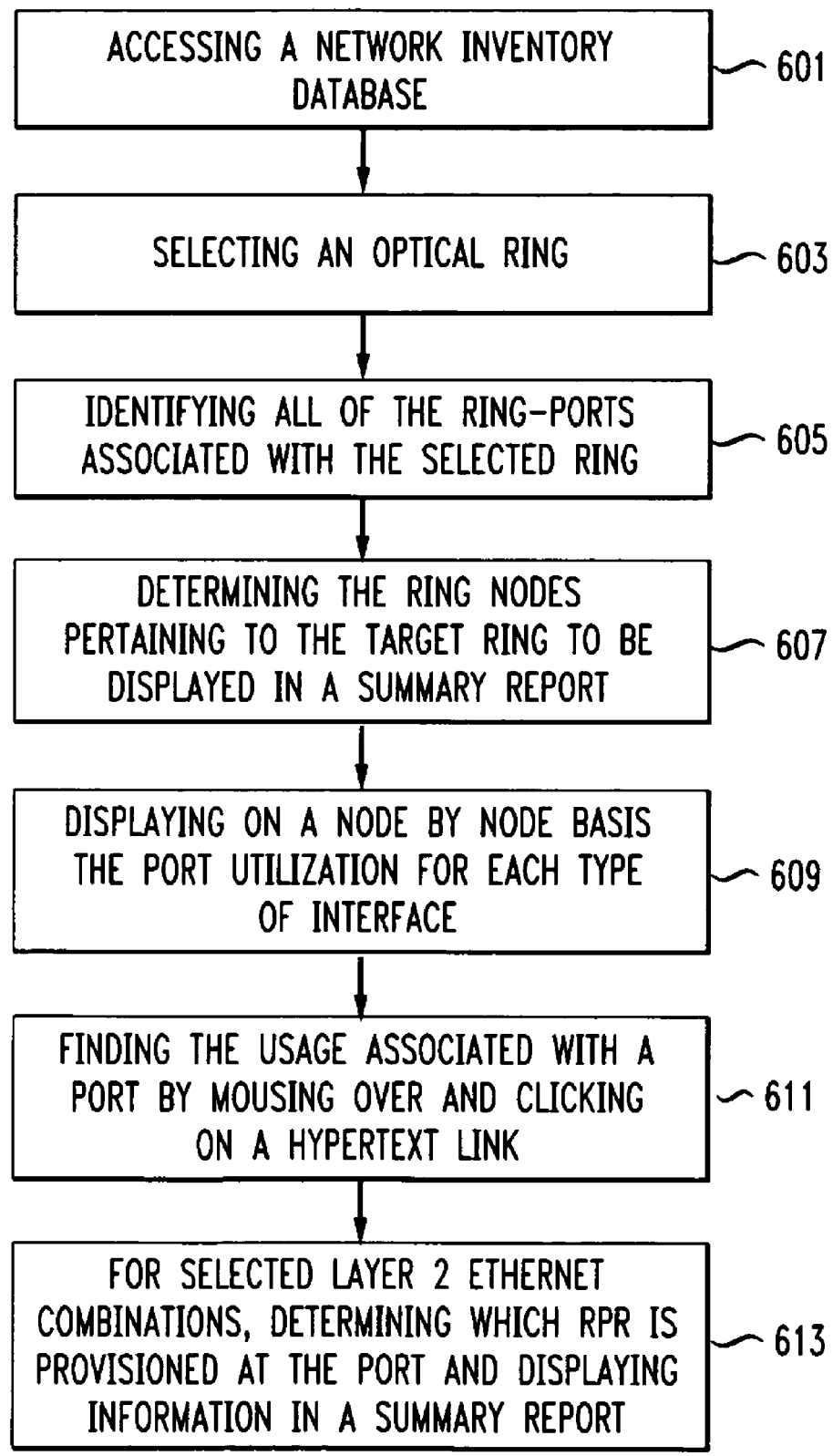
FIG. 6 is an exemplary port utilization method that indicates port use on each and every node of an optical ring of interest.
Figure 16:
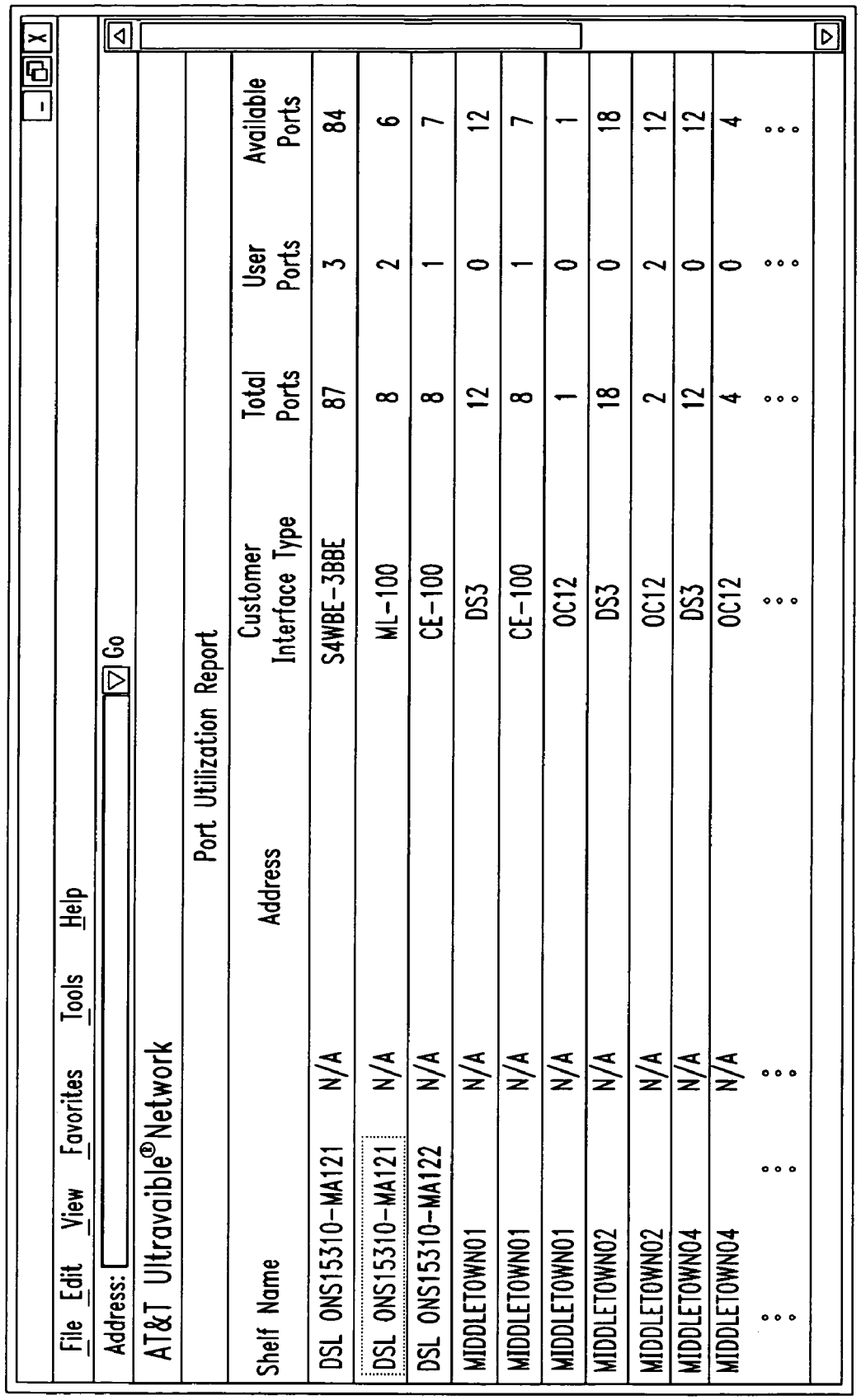
FIG. 16 is a browser window showing an exemplary port utilization summary report display.

FIG. 6 shows a port utilization method. The method indicates port utilization on each and every node pertaining to an optical ring of interest. A user selects a SONET and/or DWDM transport optical ring from the inventory database to initiate the report (steps 601, 603). Optical rings are deployed with certain protection schemes such as Bidirectional Line Switched (BLSR), Unidirectional Path Switched (UPSR), or Meshed. All of the ring-ports associated with the selected ring are identified (step 605). From the pool of identified ring-ports, the ring nodes pertaining to the target ring are determined and displayed in a summary report (step 607). FIG. 16 shows a browser window displaying a typical port utilization report.

Figure 17:
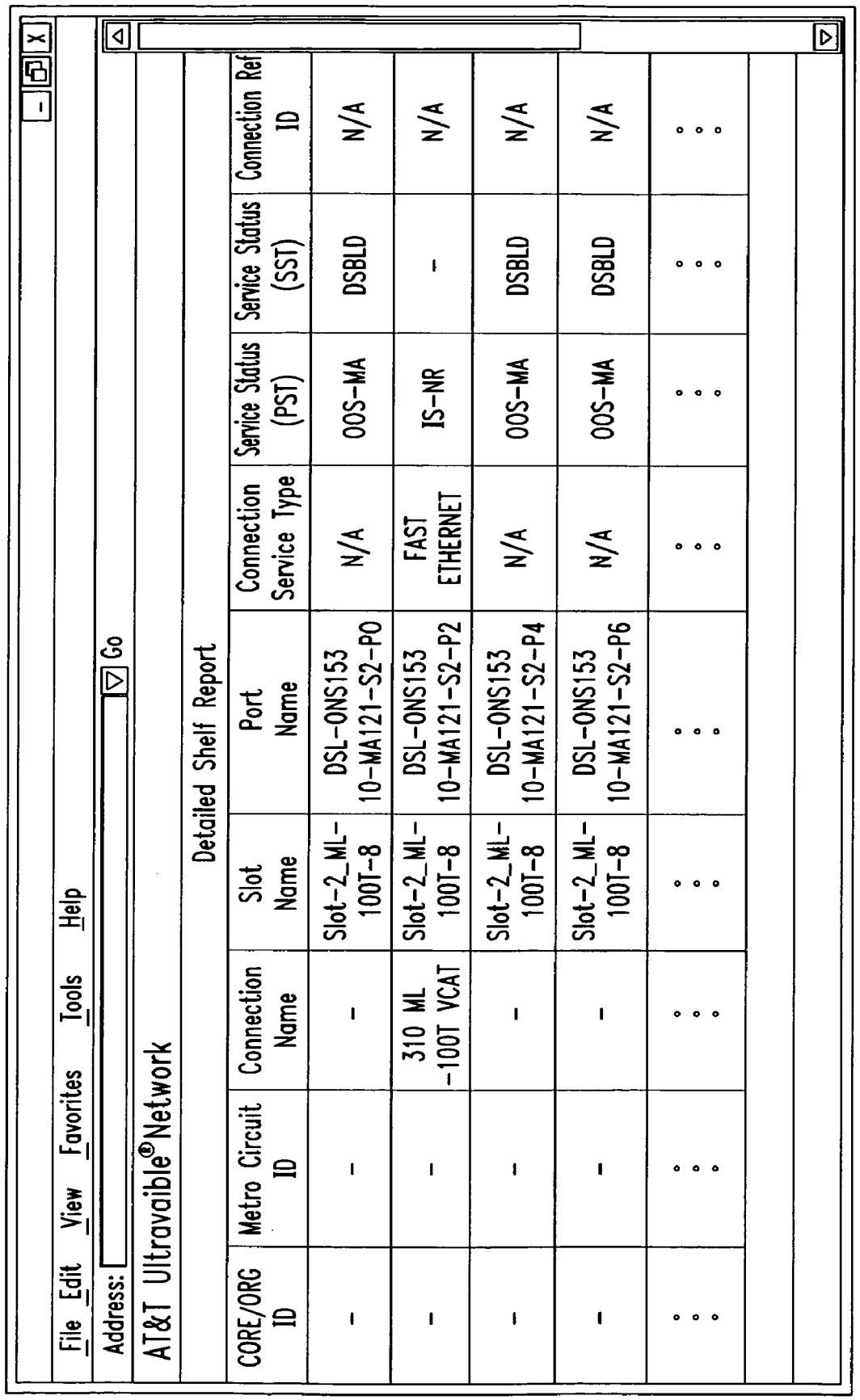
FIG. 17 is a browser window showing an exemplary details summary report display.

The nodes hosting the ring-ports are the ring nodes. On a node by node basis, the port utilization for each type of interface may be displayed (step 609). For Layer 2 Ethernet, the port utilization may be determined based on whether the Ethernet port is configured with a VLAN and RPR topology. For Layer 1 utilization, the port utilization may be determined based on whether a customer connection is provisioned. The Layer 1 transport environment is a "connection-oriented" environment in which all ports utilized for a Layer 1 transport would be associated with a connection, otherwise, a port would be idle (or unused). To determine if a port for a Layer 1 transport is used or not, a determination is performed to see if it has been provisioned for a customer circuit as described above. Port utilization is a count that includes total ports, used ports, and available ports for any particular interface type. The user may drill down further to find the usage associated with a port utilization by mousing over and clicking on a hypertext link (which is a combination of a particular interface on a particular node) (step 611). A user may mouse over and click on a hypertext link which launches a trigger via the I/O 419. The request is forwarded to a web server (via processor 413) which compiles the necessary details information from the memory cache 417 or the inventory database 407 to display the details report back to the user via the I/O. For Layer 2 Ethernet combinations selected in the previous step, the method determines which RPR is provisioned at the Ethernet port, not the WAN port, and displays the information in a summary report along with the actual port status. For example, in-service, out-of-service, etc. (step 613). Ethernet ports support LAN traffic which can communicate from any point to any other point in a VLAN. This is different from the "connection-oriented" environment of the Layer 1 transport as Layer 2 Ethernet is "connectionless". Therefore, the information presentation is different, showing the associated Layer 2 topology instead of a connection. FIG. 17 shows a browser window displaying a typical detailed shelf report.

Figure 7:
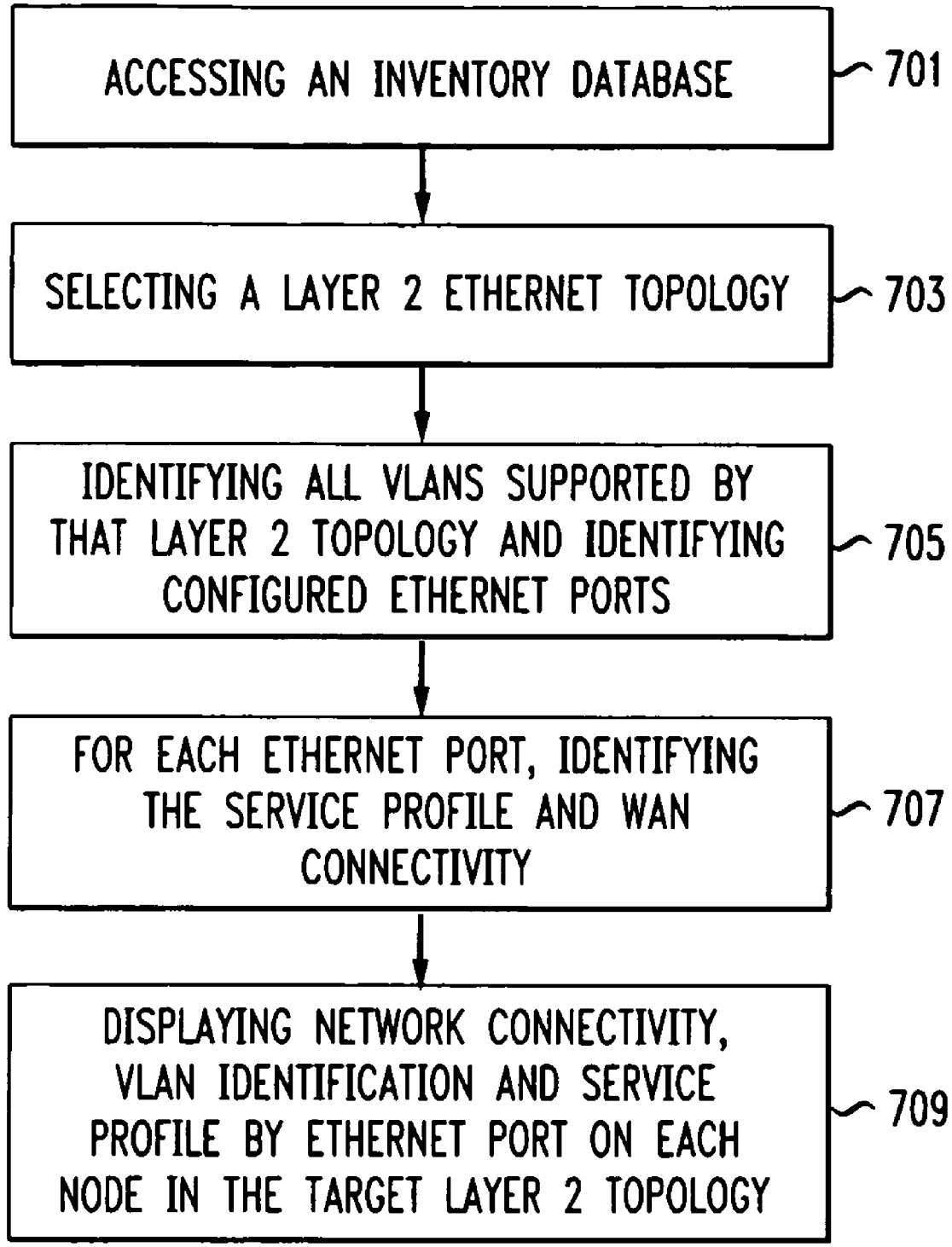
FIG. 7 is an exemplary method that indicates configuration information associated with all Ethernet ports provisioned on a Layer 2 topology of interest.

FIG. 7 shows a Layer 2 Ethernet configuration method. The method provides the configuration information associated with all of the Ethernet ports provisioned on the Layer 2 topology of interest. A user selects a Layer 2 Ethernet topology to initiate the report (steps 701, 703). The VLANs supported by that Layer 2 topology are identified. For each VLAN, Ethernet ports that are configured to have traffic on them are identified (step 705). For each Ethernet port, the service profile, and the WAN connectivity are identified (step 707). A display of the Ethernet ports on each node in the target Layer 2 topology is shown: Network connectivity—the associated WAN ports and the configured network bandwidth, VLAN identification—one or more, and Service profile—committed information rate, burst rate, peak CIR, peak burst (step 709).

Figure 8:
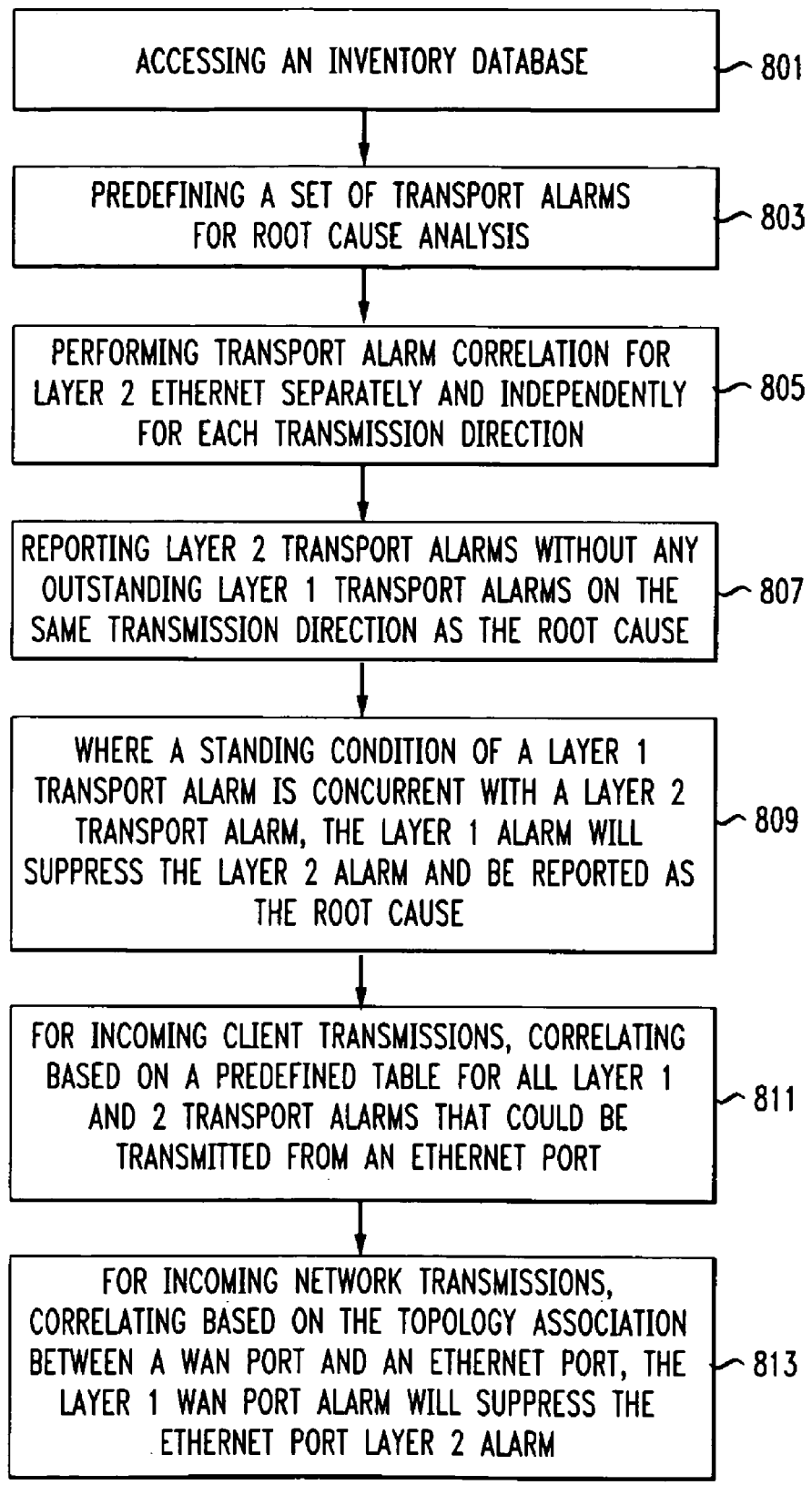
FIG. 8 is an exemplary root cause analysis method that indicates alarm correlation and suppression across Layers 1 and 2 within a device.

FIG. 8 shows a Layer 2 Ethernet root cause analysis method. The method provides alarm correlation and suppression across Layers 2 and 1 within a device such as a port/card/node in a managed domain. A single root cause may be reported among a set of correlated alarms. Autonomous alarms are reported from the network to the management application.

A set of predefined transport alarms may be processed for root cause analysis (steps 801, 803). These transport alarms may include loss of signal/loss of frame/alarm Indication signal/remote defect indication (LOS/LOF/AIS/RDI) at the Layer 1 transport and the equivalent alarms in the Layer 2 transport. The transport alarm correlation for Layer 2 Ethernet may be performed separately and independently for each transmission direction. For example, incoming from a customer versus incoming from network (step 805). The transmission direction may be at any given point of a path. Since most, if not all, of the connections supported by the framework 403 are bidirectional, each port in a path would support bidirectional traffic flow. Fault correlation can be performed independently for each traffic direction. The correlation may be performed at the terminating nodes (serving as entry/exit points of the managed domain). If a terminating node is reporting alarms on the WAN ports and the Ethernet ports facing the network (versus towards a customer), the OSS can choose to report an alarm with higher precedence (e.g., the WAN port alarms).

The Layer 2 transport alarms reported without any outstanding Layer 1 transport alarms on the same transmission direction may be reported as the root cause (step 807). For the case where a standing condition of a Layer 1 transport alarm is concurrent with a Layer 2 transport alarm, the Layer 1 alarm suppresses the Layer 2 alarm and may be reported as the root cause (step 809). For the transmission incoming from a client, the correlation may be performed based on a predefined table for all Layers 1 and 2 transport alarms that could be transmitted from an Ethernet port (step 811). For the transmission incoming from the network, the correlation will be performed based on the topology association between a WAN port and an Ethernet port. The WAN port Layer 1 alarm suppresses the Ethernet port Layer 2 alarm (step 813). Suppressing an alarm means not reporting the alarm for ticketing purposes since there is another outstanding alarm having a higher precedence which may contribute to the residual alarm.

Figure 9:
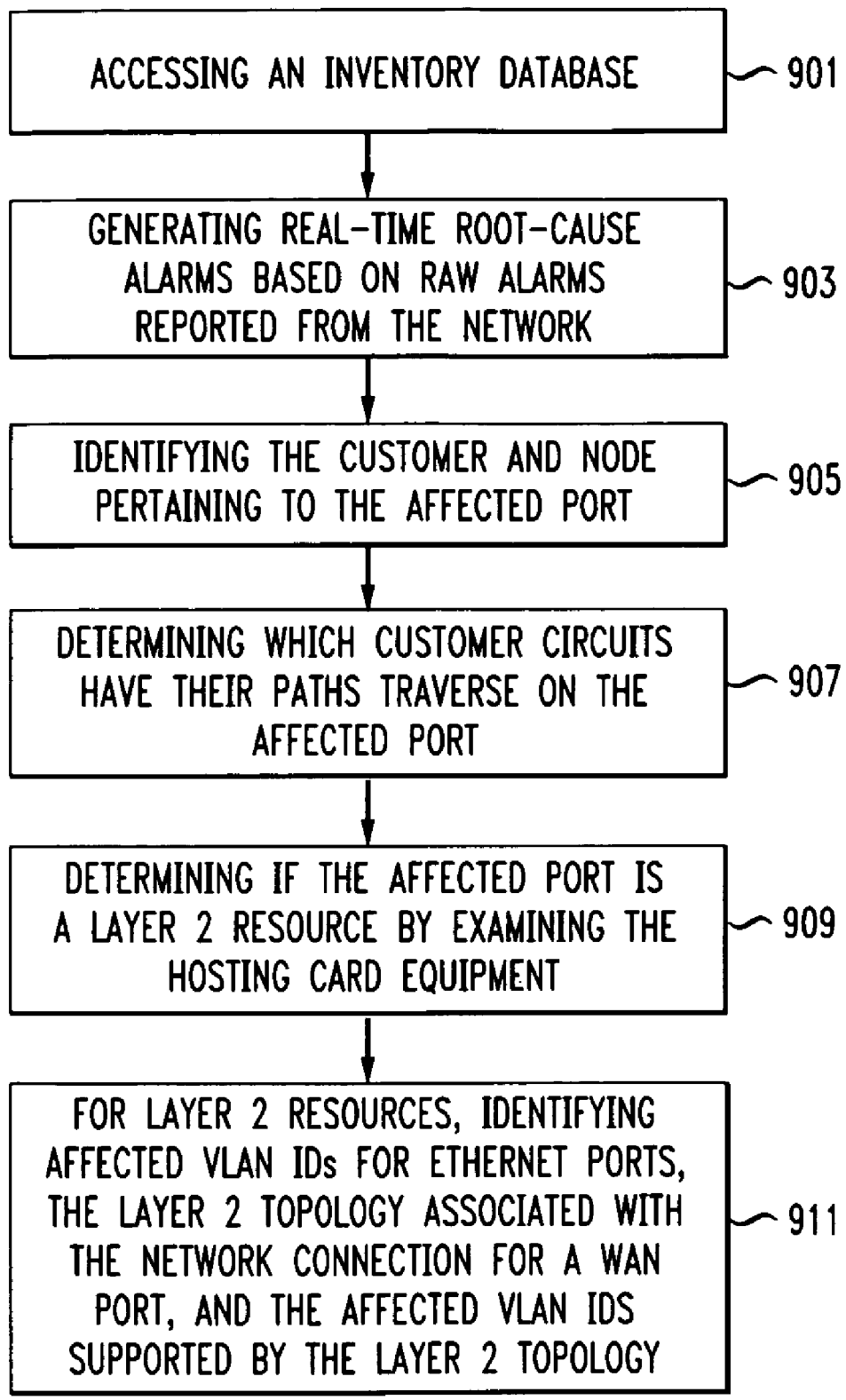
FIG. 9 is an exemplary alarm impact correlation method that provides service impact information associated with a root cause alarm reported from a "root cause analysis".

FIG. 9 shows a method for alarm impact correlation for Layer 2 Ethernet. The method provides service impact information associated with a root-cause alarm reported from a root cause analysis. The service impact information generally includes the customer and network information about the affected resources.

Real-time root-cause alarms are generated based on the analysis of raw alarms reported from the network (steps 901, 903). Network alarms are transmitted from the network to the OSS via the network interface 405. A root-cause alarm may be raised against a port instance. For service impact correlation, the customer and node pertaining to the affected port is identified (step 905). In addition, a determination is performed regarding which customer circuits have their paths traverse the affected ports and includes the port identification in the impact information (step 907). For Layer 2 Ethernet processing, the system will further determine if the affected port is a Layer 2 resource by examining the hosting card equipment (the equipment type will define if the resource is Layer 1 or Layer 2) (step 909). Layer 2 resources will have the following additional processing: a) For an Ethernet port, the system will identify the affected VLAN IDs. b) For a WAN port, the system will identify 1) the Layer 2 topology (associated with the network connection), and 2) the affected VLAN Ids supported by the Layer 2 topology (step 911).

Figure 10:
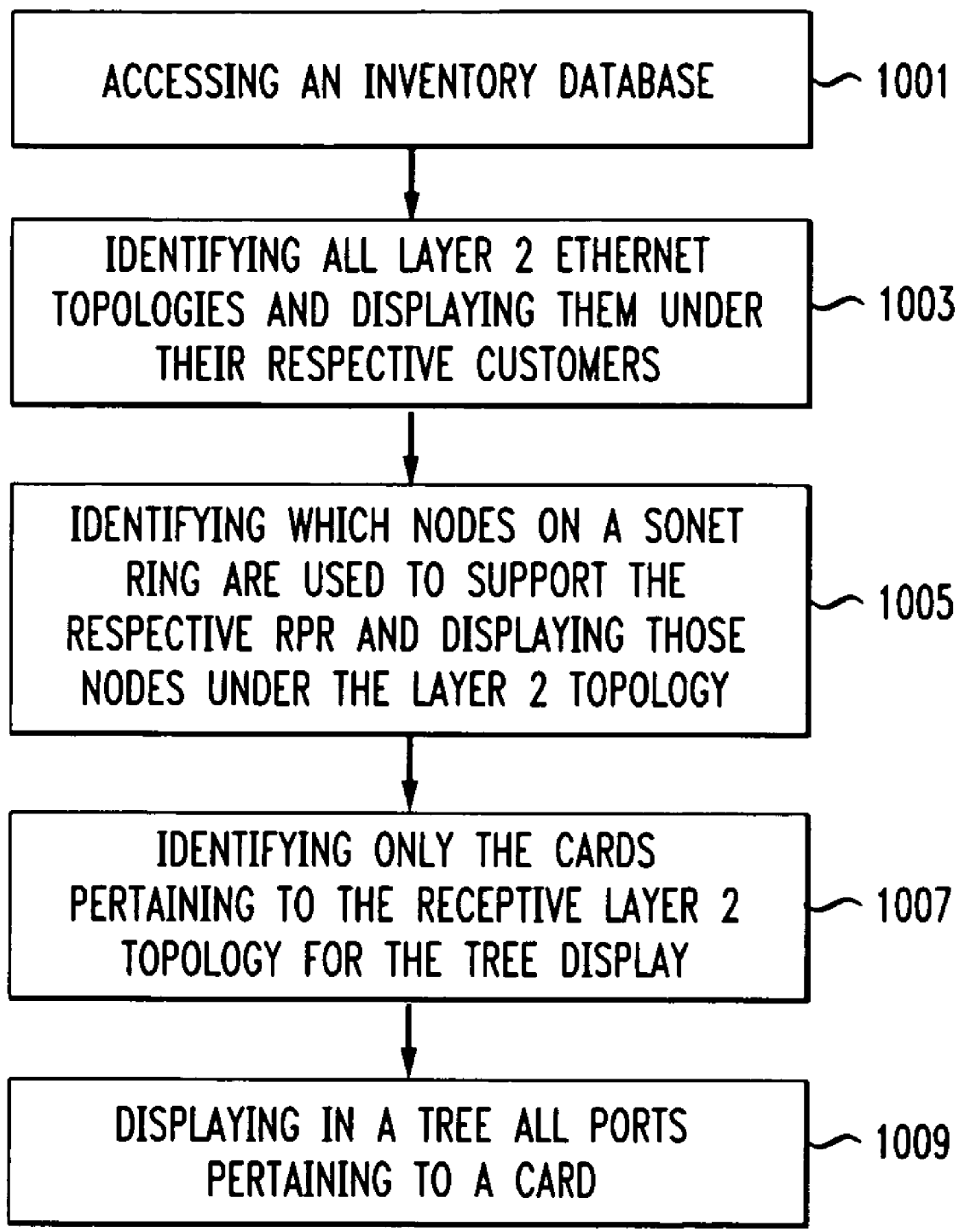
FIG. 10 is an exemplary alarm dashboard method that displays a Layer 2 topology as a map, the Layer 2 resources in an equipment tree directory, and any associated alarm information.
Figure 20:
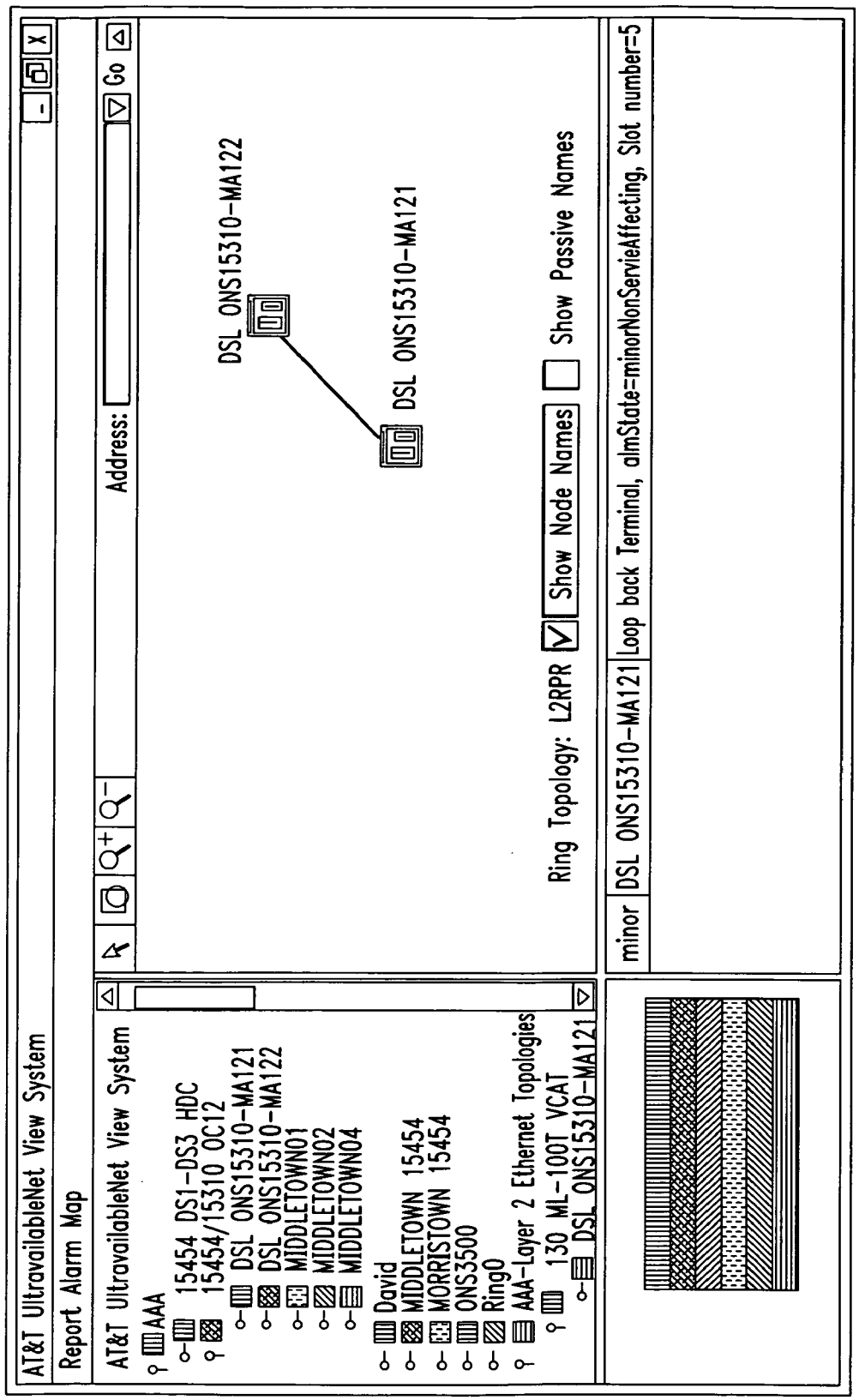
FIG. 20 is a browser window showing an exemplary RPR on the SONET ring shown in FIG. 19 display.

FIG. 10 shows an alarm dashboard display method that includes three categories: 1) displaying Layer 2 Ethernet topology as a map, 2) displaying the Layer 2 Ethernet resources in an equipment tree directory, and 3) displaying alarm information associated with 1) and 2). FIG. 19 shows a browser window displaying a typical Ethernet alarm display. FIG. 20 shows a browser window displaying a typical RPR alarm display.

For the tree display, the system identifies all Layer 2 Ethernet topologies and displays them under the respective customers. The tree structure has the following nesting order: customer, Layer 2 topology, nodes, cards, ports (steps 1001, 1003). To display only the relevant resources specific to Layer 2 Ethernet in the tree, the system identifies which nodes on the SONET ring are used to support the respective RPR and display only those nodes under the Layer 2 topology (step 1005). A node is typically used to support both Layer 1 and Layer 2 transports. Further, a node could be used to support multiple RPRs (step 1007). The system will further identify only the cards pertaining to the respective Layer 2 topology for the tree display. The system will then display in the tree all ports pertaining to the card (step 1009).

For the topology display, at a user's command initiated from the equipment tree directory, the system can display the network topology for a Layer 2 Ethernet topology or an RPR. For example, an exemplary SONET ring comprises five nodes (FIG. 19). An RPR using only two nodes would display a topology of the relevant nodes (two instead of all 5 nodes on the SONET ring) (FIG. 20). Further, the tree of the Layer 2 topology would only display the cards supporting the Layer 2 Ethernet (and not all the other cards that were also used in the nodes for other transports, for example OC-X/DSX). For a Layer 2 topology inventoried in the database, the system will identify a) nodes supporting the Layer 2 topology and b) connections supporting the Layer 2 topology. To create a Layer 2 topology map for display, the system will identify the two nodes terminating the connections found in step b) and connect the nodes via the connections.

For the Alarm Display/Summary, All alarms raised against the port instances will be displayed in the equipment tree and topology map with the proper color coding, for example, red for critical, orange for major, etc. The setup in the map topology and the tree will automatically filter in only the alarms relevant to the Layer 2 Ethernet (i.e., when the framework matches the affected port in the alarm with the tree and network equipment, only the Layer 2 Ethernet equipment will be found, those not found will not be displayed).

Figure 11:
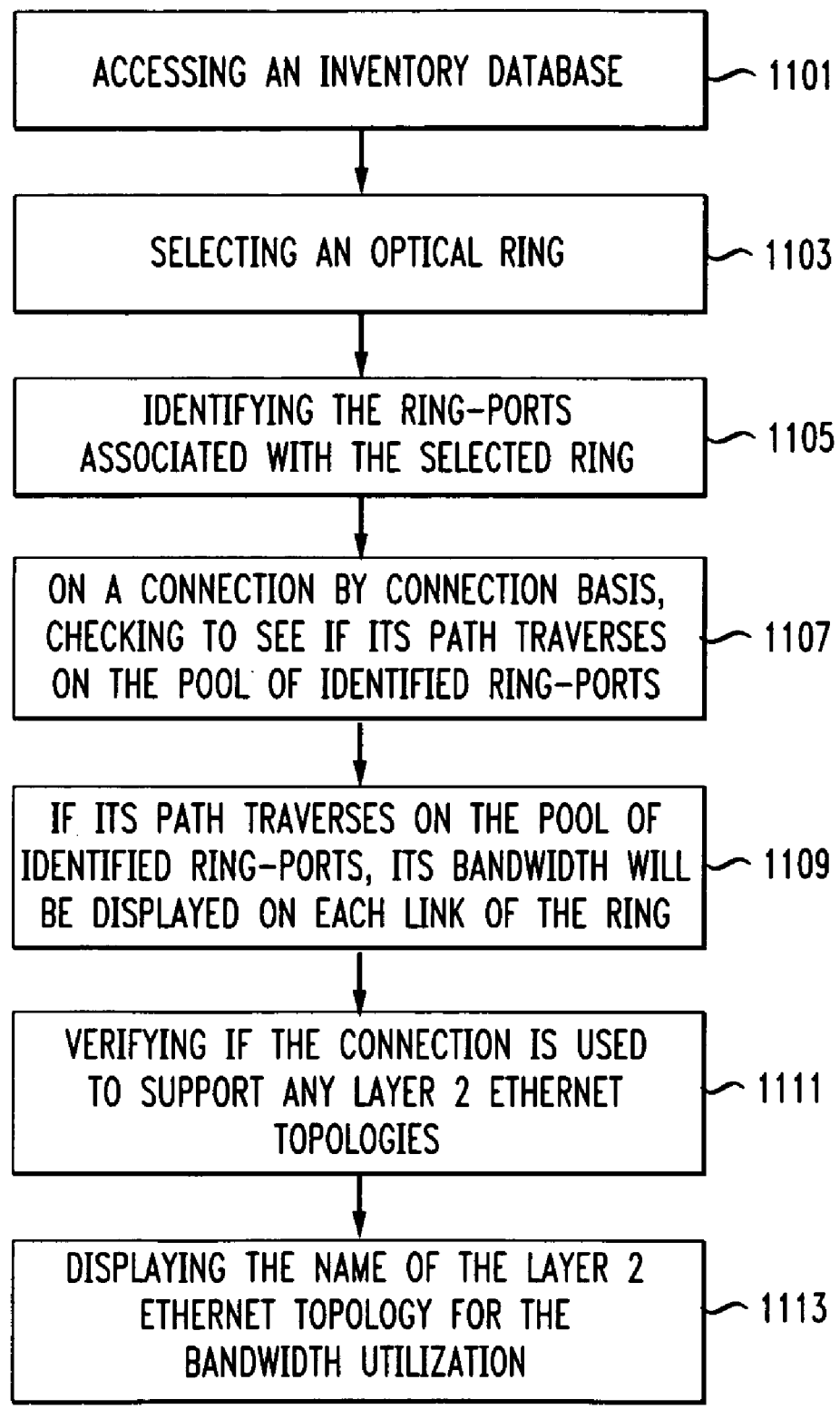
FIG. 11 is an exemplary information search method that provides bandwidth utilization pertaining to all connections on an optical ring of interest.

FIG. 11 shows an information search method (SONET bandwidth utilization as example). The method provides the bandwidth utilization pertaining to all connections riding on an optical ring of interest.

A user selects an optical ring to initiate the report (steps 1101, 1103). The system first identifies all the ring-ports associated with the selected ring (step 1105). On a connection by connection basis, the system will check to see if its path traverses on the pool of identified ring-ports (step 1107). If it does, then its bandwidth will be displayed on each link of the ring (step 1109).

For Layer 2 Ethernet Usage the system will further verify if the connection is used to support any Layer 2 Ethernet topologies (step 1111). If it does, the name of the Layer 2 Ethernet topology for the bandwidth utilization is displayed (step 1113).

Figure 12:
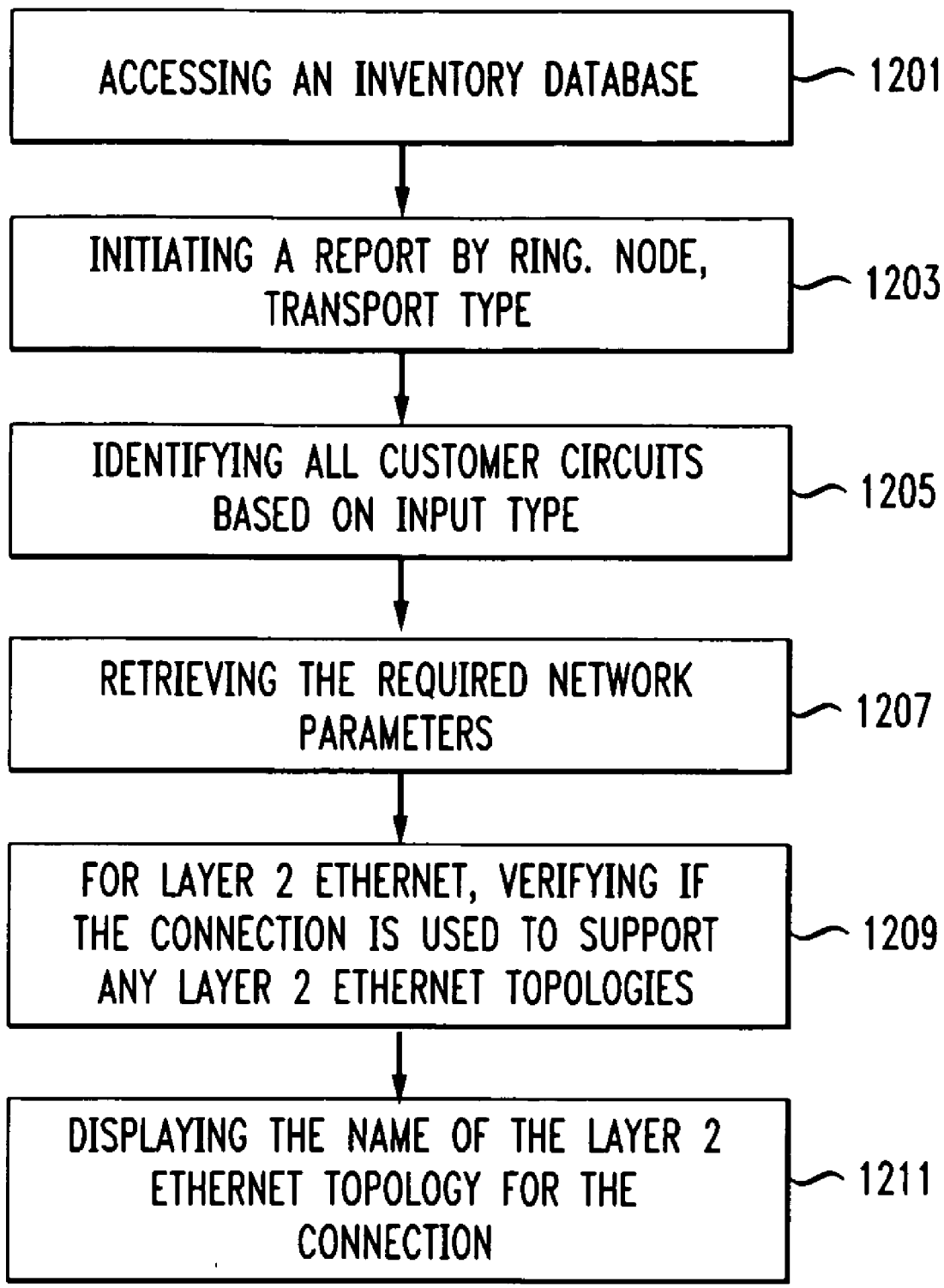
FIG. 12 is an exemplary provisioned connection/hardware inventory/connection details method that provides various network parameters on a connection by connection basis.

FIG. 12 shows a provisioned connection/hardware/details method. The method provides the user with various network parameters on a connection by connection basis. How the connections are bundled/retrieved are based on user inputs and different parameters may be displayed in each report.

The user initiates a report via one or more of the following: 1) specific ring, 2) specific node, 3) specific transport type, 4) no specifics (steps 1201, 1203). The framework identifies all customer circuits based on the user inputs (step 1205). Depending on the report type, the system will retrieve the required network parameters for display (step 1207).

For Layer 2 Ethernet usage, the system will further verify if the connection is used to support any Layer 2 Ethernet topologies (step 1209). If it does, the name of the Layer 2 Ethernet topology for the connection is displayed (step 1211).

One or more embodiments of the present invention have been described. Nevertheless, it will be understood that various modifications may be made without departing from the spirit and scope of the invention. Accordingly, other embodiments are within the scope of the following claims.

What is claimed is:

1. A method for vertically integrating telecommunications network management across multiple transport domains and network layers to support end to end network management comprising:
    establishing a network inventory database for Layer 1 optical network devices in a managed domain;
    discovering all Ethernet cards from the managed domain;
    discovering all ports on the Ethernet cards;
    discovering all Layer 2 topologies in the managed domain;
    discovering all virtual local area networks in the managed domain;
    creating an inventory database of key relationships between Layer 2 information, the Layer 2 information including discovered Ethernet ports, Layer 2 topology, and virtual local area networks, and the Layer 1 optical network;
    indicating configuration information associated with all of the Ethernet ports provisioned on the Layer 2 topology in the managed domain comprising:
        selecting a target Layer 2 Ethernet topology;
        identifying virtual local area networks supported by the target Layer 2 topology;
        for each virtual local area network, identifying associated Ethernet ports that are configured to have traffic on them; and
        for each identified Ethernet port having traffic, identifying the service profile and the wide area network connectivity of the traffic; and
    showing a network connectivity, wherein the network connectivity includes connectivity selected from the group consisting of Wide Area Network ports associated with the identified Ethernet ports and a configured network bandwidth, virtual local area network identification and a service profile.

2. The method according to claim 1 wherein establishing an inventory database for the Layer 1 optical network devices further comprises:
    inventorying all network information (in the forms of ring/node/card/port/link/path/connection) in the managed domain; and
    provisioning customer information onto all the nodes and connections in the inventory database.

3. The method according to claim 2 wherein discovering all Layer 2 topologies in the managed domain further comprises:
    retrieving inventory information of all Layer 2 topologies in the managed domain from the network either through an element management system or directly from each network element; and
    creating a Layer 2 topology inventory in the management database to store each Layer 2 topology data.

4. The method according to claim 1 wherein discovering all Ethernet cards from the managed domain further comprises:
    retrieving inventory information from all transport equipment including network elements in the managed domain;
    updating existing card inventory in tile network inventory database whose node identification equals the node name returned from the network, if the card does not exist, creating a card inventory with the node identification that equals the node name returned from the network; and
    identifying the Layer 2 Ethernet cards from the transport equipment.

5. The method according to claim 1 wherein discovering all ports on the Ethernet cards further comprises:

retrieving all ports (Ethernet ports and wide area network ports) for each Layer 2 Ethernet card;

updating existing port inventory whose card identification equals the card name returned from the network, if the port does not exist, creating a port inventory with the card identification that equals the card name returned from the network;

retrieving all bridges on each Layer 2 Ethernet card;

associating an Ethernet port to a wide area network port according to the bridge configuration; and identifying all Layer 1 optical connections in the network inventory, whose end nodes are terminated with wide area network ports at a Layer 2 Ethernet card.

6. The method according to claim 1 wherein discovering all virtual local area networks in the managed domain further comprises:

retrieving information of all virtual local area networks for each Layer 2 topology;

creating a virtual local area network inventory to store each virtual local area network data; and identifying the pools of Ethernet ports associated with each of the virtual local area networks.

7. The method according to claim 1 wherein creating an inventory database of key relationships between the Layer 2 information and the Layer 1 optical network further comprises:

correlating the Ethernet ports to wide area network ports;

correlating the Ethernet ports to an optical node;

correlating the Layer 2 topology to the Layer 1 connections via the inventory database relationships (Layer 2 topology/virtual local area networks/Ethernet ports/wide area network ports/Connection); and correlating the Layer 2 topology to a customer via the inventory database relationships (Layer 2 topology/connections/customer).

8. The method according to claim 1 further comprising indicating port utilization comprising:

selecting an optical ring from the inventory database;

identifying ring ports associated with the selected ring;

from the pool of identified ring ports, determining the ring nodes pertaining to the target ring wherein the nodes hosting the ring ports are the ring nodes;

displaying the ring nodes; and displaying on a node by node basis the port utilization for each type of interface.

9. The method according to claim 8 further comprising determining whether the Ethernet port is configured with a virtual local area network and resilient packet ring topology.

10. The method according to claim 9 further comprising:

determining which resilient packet ring is provisioned at the port; and displaying the provisioned resilient packet ring(s) along with actual port status.

11. The method according to claim 8 further comprising determining whether a customer connection is provisioned.

12. The method according to claim 8 wherein port utilization is a count including total ports, used ports, and available ports for any interface type.

13. A method for vertically integrating telecommunications network management across multiple transport domains and network layers to support end to end network management comprising:

establishing a network inventory database for Layer 1 optical network devices in a managed domain;

discovering all Ethernet cards from the managed domain;

discovering all ports on the Ethernet cards;

discovering all Layer 2 topologies in the managed domain;

discovering all virtual local area networks in the managed domain;

creating an inventory database of key relationships between Layer 2 information, the Layer 2 information including discovered Ethernet ports, Layer 2 topology, and virtual local area networks, and the Layer 1 optical network; and processing transport alarms for root cause analysis comprising:

correlating transport alarms for Layer 2 Ethernet separately and independently for each transmission direction comprising:

for transmissions incoming from a client, correlating based on a predefined table for all Layers 1 and 2 transport alarms that could be transmitted from an Ethernet port; and for transmission incoming from a network, correlating based on the topology association between a wide area network port and an Ethernet port;

for Layer 2 transport alarms without any outstanding Layer 1 transport alarms on the same transmission direction, reporting the Layer 2 transport alarms as a root cause; and if a standing condition of a Layer 1 transport alarm is concurrent with a Layer 2 transport alarm, suppressing the Layer 2 alarm and reporting the Layer 1 transport alarm as the root cause.

14. The method according to claim 13 wherein transport alarms include loss of signal/loss of frame/alarm indication signal/remote defect indication at the Layer 1 transport and the equivalent alarms in the Layer 2 transport.

15. A method for vertically integrating telecommunications network management across multiple transport domains and network layers to support end to end network management comprising:

establishing a network inventory database for Layer 1 optical network devices in a managed domain;

discovering all Ethernet cards from the managed domain;

discovering all ports on the Ethernet cards;

discovering all Layer 2 topologies in the managed domain;

discovering all virtual local area networks in the managed domain;

creating an inventory database of key relationships between the Layer 2 information, the Layer 2 information including discovered Ethernet ports, Layer 2 topology, and virtual local area networks, and the Layer 1 optical network; and correlating alarm service impact information associated with a root cause alarm reported from a root cause analysis for Layer 2 Ethernet comprising:

analyzing raw alarms from a network;

generating real time root cause alarms based on the analyzed raw alarms;

identifying the customer and node pertaining to an affected port;

determining which customer circuits have their paths traverse the affected port(s);

identifying the port;

for Layer 2 Ethernet, determining if the affected port is a Layer 2 resource by examining the hosting card equipment;

if Layer 2 Ethernet, identifying affected virtual local area network IDs; and if a wide area network port, identifying the Layer 2 topology associated with the customer circuits and affected virtual local area networks supported by the Layer 2 topology.

16. The method according to claim 15 wherein the service impact information includes the customer and network information about the affected resources.

17. A method for vertically integrating telecommunications network management across multiple transport domains and network layers to support end to end network management comprising:
- establishing a network inventory database for Layer 1 optical network devices in a managed domain;
- discovering all Ethernet cards from the managed domain;
- discovering all ports on the Ethernet cards;
- discovering all Layer 2 topologies in the managed domain;
- discovering all virtual local area networks in the managed domain; and
- creating an inventory database of key relationships between the Layer 2 information, the Layer 2 information including discovered Ethernet ports, Layer 2 topology, and virtual local area networks, and the Layer 1 optical network; and
- further comprising an alarm dashboard display method comprising:
  - displaying Layer 2 Ethernet or resilient packet ring topology as a map comprising:
    - for a Layer 2 topology inventoried in the inventory database, identifying nodes supporting the Layer 2 topology and connections supporting the Layer 2 topology;
    - identifying the two nodes terminating the connections;
    - connecting the nodes via the connections;
    - displaying a Layer 2 topology map;
  - displaying the Layer 2 Ethernet resources in an equipment tree directory comprising:
    - for a tree directory, identifying Layer 2 Ethernet topologies according to respective customers;
    - identifying which nodes on a SONET ring are used to support the respective resilient packet ring and only those nodes under the Layer 2 topology;
    - identifying only the cards pertaining to the respective Layer 2 topology for the tree directory;
    - identifying all ports pertaining to a card;
  - displaying alarm information associated with the Layer 2 Ethernet topology and resources comprising:
    - for an alarm display/summary, identifying all alarms raised against port instances in the equipment tree directory and topology map with color coding; and
    - filtering only the alarms relevant to the Layer 2 Ethernet, wherein when an affected port in the alarm matches with the tree and map network equipment, only the Layer 2 Ethernet equipment will be found.

18. The method according to claim 17 wherein the tree structure further comprises a nesting order that includes customer, Layer 2 topology, nodes, cards, and ports.

19. The method according to claim 17 wherein a node is used to support both Layer 1 and Layer 2 transports and multiple resilient packet rings.

* * * * *